United States Patent [19]

Usui

[11] Patent Number: 4,656,535

[45] Date of Patent: Apr. 7, 1987

[54] RECORDING APPARATUS WITH RANDOM MUSIC SELECTION

[75] Inventor: Minoru Usui, Tokyo, Japan

[73] Assignee: Casio Computer Co., Ltd., Tokyo, Japan

[21] Appl. No.: 761,102

[22] Filed: Jul. 31, 1985

Related U.S. Application Data

[62] Division of Ser. No. 475,109, Mar. 14, 1983, Pat. No. 4,615,024.

[30] Foreign Application Priority Data

| | | | |
|---|---|---|---|
| Mar. 19, 1982 | [JP] | Japan | 57-38016 |
| Aug. 27, 1982 | [JP] | Japan | 57-147727 |
| Sep. 10, 1982 | [JP] | Japan | 57-136530 |
| Dec. 6, 1982 | [JP] | Japan | 57-212802 |
| Dec. 27, 1982 | [JP] | Japan | 57-197030 |

[51] Int. Cl.[4] ........ G11B 5/008

[52] U.S. Cl. ........ 360/72.1; 369/47; 360/27

[58] Field of Search ........ 360/27, 63, 71, 72.1, 360/72.2, 78; 369/47

[56] References Cited

U.S. PATENT DOCUMENTS

| | | | |
|---|---|---|---|
| 4,022,097 | 5/1977 | Strangio | 84/DIG. 12 |
| 4,180,838 | 12/1979 | Fehrenkamp | 360/72.1 |
| 4,281,579 | 8/1981 | Bennett, Sr. | 84/478 |
| 4,338,644 | 7/1982 | Staar | 360/132 |
| 4,487,101 | 12/1984 | Ellen | 84/462 |

FOREIGN PATENT DOCUMENTS

| | | |
|---|---|---|
| 0092167 | 10/1983 | European Pat. Off. . |
| 2800387 | 7/1979 | Fed. Rep. of Germany . |
| 2379123 | 8/1978 | France . |
| 1415987 | 12/1975 | United Kingdom . |
| 2004107 | 3/1979 | United Kingdom . |
| 2003642 | 3/1979 | United Kingdom . |
| 2032162 | 4/1980 | United Kingdom . |
| 1577772 | 10/1980 | United Kingdom . |
| 2062341 | 5/1981 | United Kingdom . |
| 1602696 | 11/1981 | United Kingdom . |
| 1603828 | 12/1981 | United Kingdom . |
| 2127607A | 4/1984 | United Kingdom . |

OTHER PUBLICATIONS

Das Musikinstrument, 21. Jahrgang, H. 2, Feb. 1972, S. 165 and 167.

*Primary Examiner*—Robert L. Richardson
*Attorney, Agent, or Firm*—Frishauf, Holtz, Goodman & Woodward

[57] ABSTRACT

A plurality of music number data records of several hundreds of music numbers are sequentially recorded on a magnetic tape, such as a compact cassette tape with a blank space therebetween. The recorded music number data records are continuously and randomly reproduced and stored in digital form in a RAM so as to continuously auto-play a plurality of music numbers by means of a tone generator.

5 Claims, 39 Drawing Figures

FIG. 7

| UPPER / LOWER | 0 | 1 | 2 | 3 | 4 | 5 |
|---|---|---|---|---|---|---|
| 0 | | | N.C. | | | RHYTHM-LESS |
| 1 | DO | ḊO | C | m | PIANO | WALTZ |
| 2 | DO# | ḊO# | C# | 7 | ORGAN | BALLAD |
| 3 | RE | ṘE | D | m7 | VIOLIN | SWING |
| 4 | RE# | ṘE# | D# | M7 | HORN | ENKA |
| 5 | MI | ṀI | E | 6 | FANTASY | 16 BEAT |
| 6 | FA | ḞA | F | m6 | MELLOW | ROCK-1 |
| 7 | FA# | ḞA# | F# | SUS4 | BASS | ROCK-2 |
| 8 | SO | ṠO | G | dim | FLUTE | ROCK-3 |
| 9 | SO# | ṠO# | G# | mM7 | HARPSI-CHORD | DISCO-1 |
| A | LA | L̇A | A | aug | GUITAR | DISCO-2 |
| B | LA# | L̇A# | A# | | | BOSSA NOVA |
| C | TI | ṪI | B | | | $\frac{5}{4}$ BEAT |
| D | | | | | | MAMBO |
| E | | | | | | RUMBA |
| F | | | | | | BIGINE |

FIG. 13
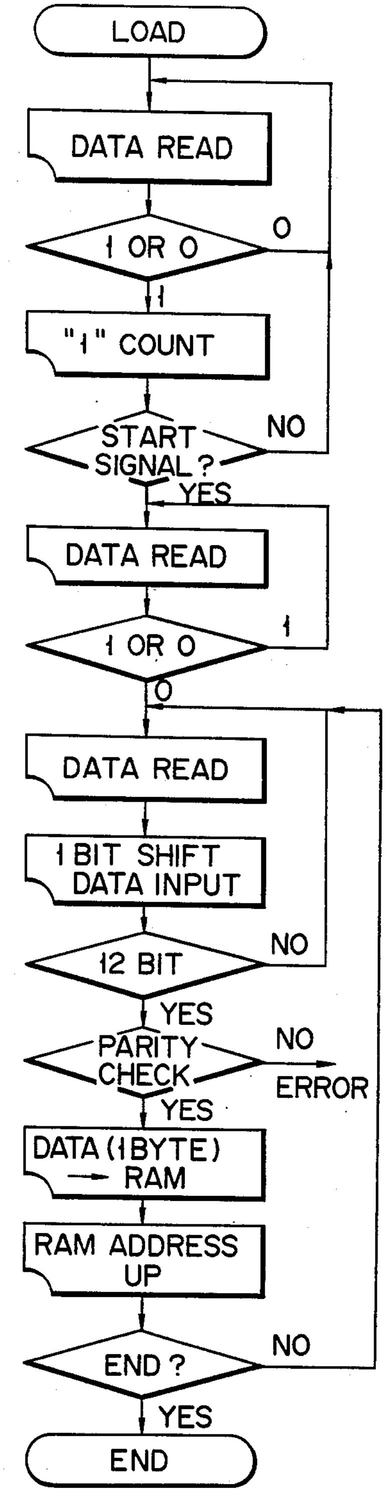
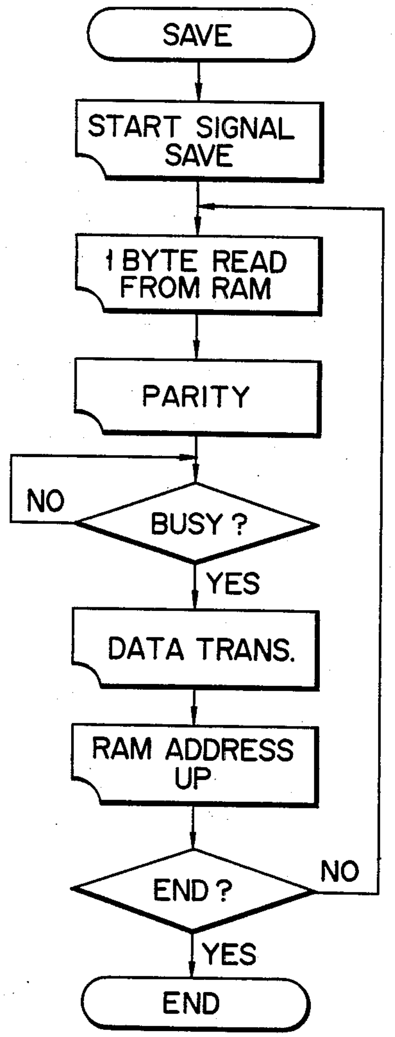
FIG. 11

| | |
|---|---|
| PIANO | BLOCK 1 |
| HARPSICHORD | BLOCK 2 |
| ORGAN | BLOCK 3 |
| VIOLIN | BLOCK 4 |
| FLUTE | BLOCK 5 |
| HORN | BLOCK 6 |
| FANTASY | BLOCK 7 |
| MELLOW | BLOCK 8 |

RECORDING APPARATUS WITH RANDOM MUSIC SELECTION

This is a division of application Ser. No. 475,109 filed Mar. 14, 1983 and now U.S. Pat. No. 4,615,024.

BACKGROUND OF THE INVENTION

This invention relates to an electronic apparatus with a data recording and reproducing device, and more particularly to an electronic apparatus with a magnetic recording and reproducing device for recording tone data of melody or the like as digital data on a magnetic recording medium such as a magnetic tape and reading it back for reproducing the melody or the like.

Electronic musical instruments, in which tone data can be preset in an internal memory and read out for auto-play, have been used. The internal memory, however, is a semiconductor memory having relatively small capacity. Therefore, it is impossible to store a plurality of music numbers and selectively read them out for reproduction in auto-play. Usually, only a single music number can be stored in the semiconductor memory, and if it is desired to obtain the auto-play of a different number, it is necessary to renew the memory data.

Magnetic recording medium such as a magnetic tape is used as means for recording a large quantity of music numbers. With a data reproducing device of the conventional type, such as a cassette tape recorder, music numbers, etc., recorded on a magnetic tape have been sequentially read and reproduced in accordance with a recorded sequence, starting from the leading and or a middle of the magnetic tape. Thus, music can be reproduced only in a recorded sequence and, therefore, the output is monotonous to the listener.

SUMMARY OF THE INVENTION

An object of the invention is to provide an electronic apparatus including a data reproducing device which is able to offer reproductions without losing freshness, though the same recording means is repeatedly used for the reproductions.

According to the present invention, in order to achieve the above-described object, a random number generated by a random number generation means is compared with a recording sequence number from the means for reading a recording sequence of each data stored in the recording means and, by selecting the data of the same sequence as the random number, a plurality of data are randomly reproduced.

BRIEF DESCRIPTION OF THE DRAWINGS

FIG. 7 is a view showing a tone data format table;

FIG. 11 is a flow chart for explaining the operation of the circuit of FIG. 3;

FIG. 13 is a flow chart for explaining the operation of the circuit of FIG. 3;

DETAILED DESCRIPTION OF THE PREFERRED EMBODIMENTS

Figure 1:
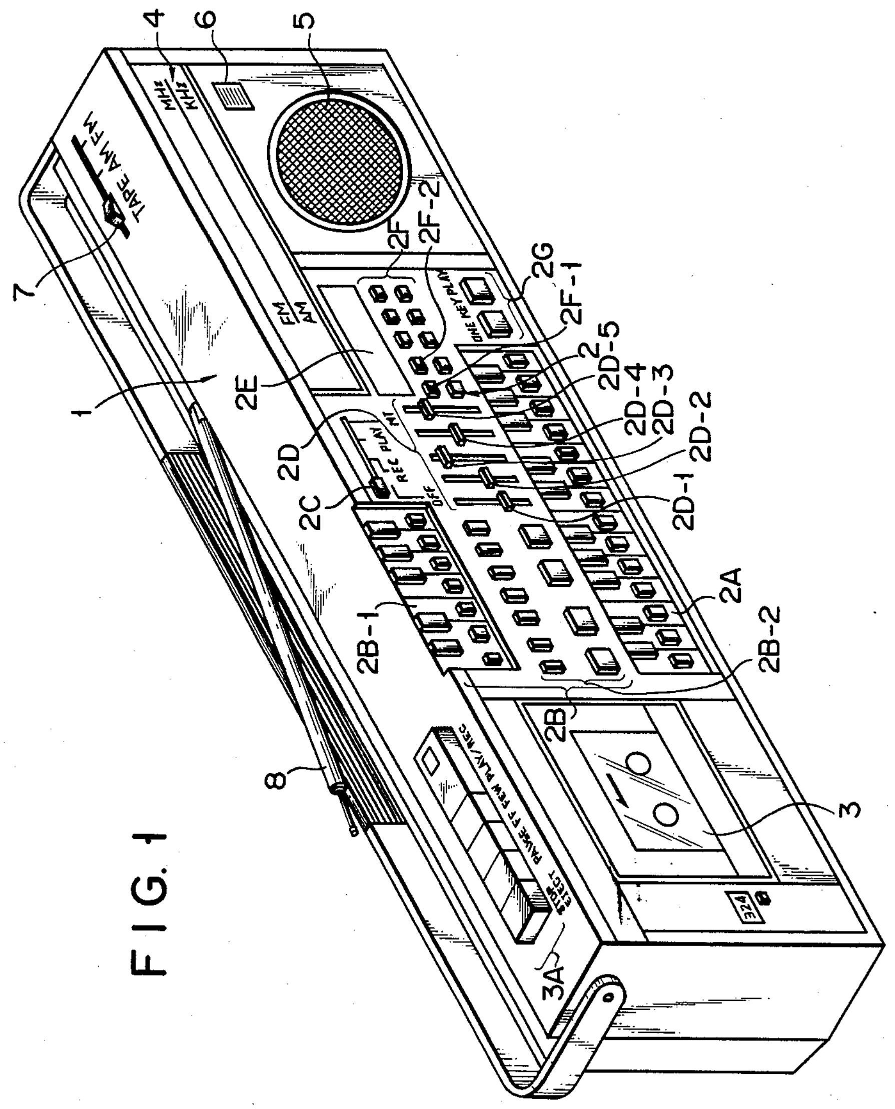
FIG. 1 is a perspective view showing an embodiment of the electronic musical instrument with tape recorder according to the invention.

An embodiment of the invention will now be described. Referring to FIG. 1, there is shown an electronic musical instrument with tape recorder. The instrument comprises a casing 1, the front of which has an electronic musical instrument section 2 provided in a central portion and a cassette tape recorder section 3 provided on the left side of the section 2. A radio receiver section 4 is provided on a right upper portion, and a sounding section 5 and an internal microphone 6 are provided under the section 4. The top of the casing 1 has a first mode switch provided on a right hand portion. It also has a switch group 3A provided on a left hand portion. The switch group 3A permits selection of six different modes of the cassette tape recorder section 3. An antenna 8 is provided on a rear portion of the top of the casing 1. It can supply intercepted electromagnetic waves to an internal circuitry in the instrument. The casing 1 accommodates various components of the electronic musical instrument section, cassette tape recorder section and radio receiver section as well as electronic components of an acoustic transducer circuitry, a battery and a loudspeaker, these being common to these sections.

The electronic musical instrument section 2 has a play key group 2A having play keys for two octaves (i.e., 24 keys) arranged in the form of a keyboard. It also has a chord designation key group 2B, a second mode switch 2C and a volume switch group 2D, these key and switch groups being provided above the play key group 2A. It further has a display section 2E and a control key group 2F. The control key group 2F is used to couple musical data of melody or the like to a RAM (random access memory, for instance constituted by a C-MOS to be described later) for auto-play. The section 2 further has a one-key play key section 2G. The play keys in the play key group 2A can be used for ordinary manual play. They also can be used together with the control key group 2F to designate memory numbers (i.e., number of memory area divisions of the RAM), rhythm patterns and accompaniment arpeggio patterns. This, however, is irrelevant to the invention and, hence, is not described.

The chord designation key 2B includes a root designation key group 2B-1 and a chord kind designation key group 2B-2, these key groups being in the form of keyboards. It allows a large number of different chords such as major, minor and seventh chords with respect to 12 different roots to be produced.

The second mode switch 2C can designate a power "off" (OFF) mode, a recording (REC) mode, an ordinary play (PLAY) mode and a tape (TM) mode of the electronic musical instrument section 2.

The volume control group 2D includes volume controls 2D-1 and 2D-2 for controlling the overall volume and tone volume respectively and controls 2D-3, 2D-4 and 2D-5 for controlling the volumes of melody, chord and rhythm respectively.

The display section 2E may be a liquid crystal display, and it can display program data including musical data of notes, chords, etc. obtainable by operating the various keys and switches noted above.

The control key group 2F includes a save key 2F-1 and a load key 2F-2 along with other keys. The save key 2F-1 is used for transferring data in the RAM to a magnetic tape in the cassette tape recorder section 3 with the electronic musical instrument section 2 in the tape (TM) mode. The load key 2F-2 is used for transferring data from the magnetic tape into the RAM in the same mode.

The switch group 3A for the cassette tape recorder section 3 has switches for well-known functions, i.e., a tape stop/eject function, a tape pause function, a tape fast feed function, a tape rewind function and a play/record function. The mechanism for accommodating the magnetic tape (not shown) and the play/record function, are the same as in the prior art and are not described.

The radio receiver section 4 also has the same construction as in a well-known cassette tape recorder with radio receiver. In the instant embodiment, it can receive both AM and FM broadcast channels.

Figure 2A:
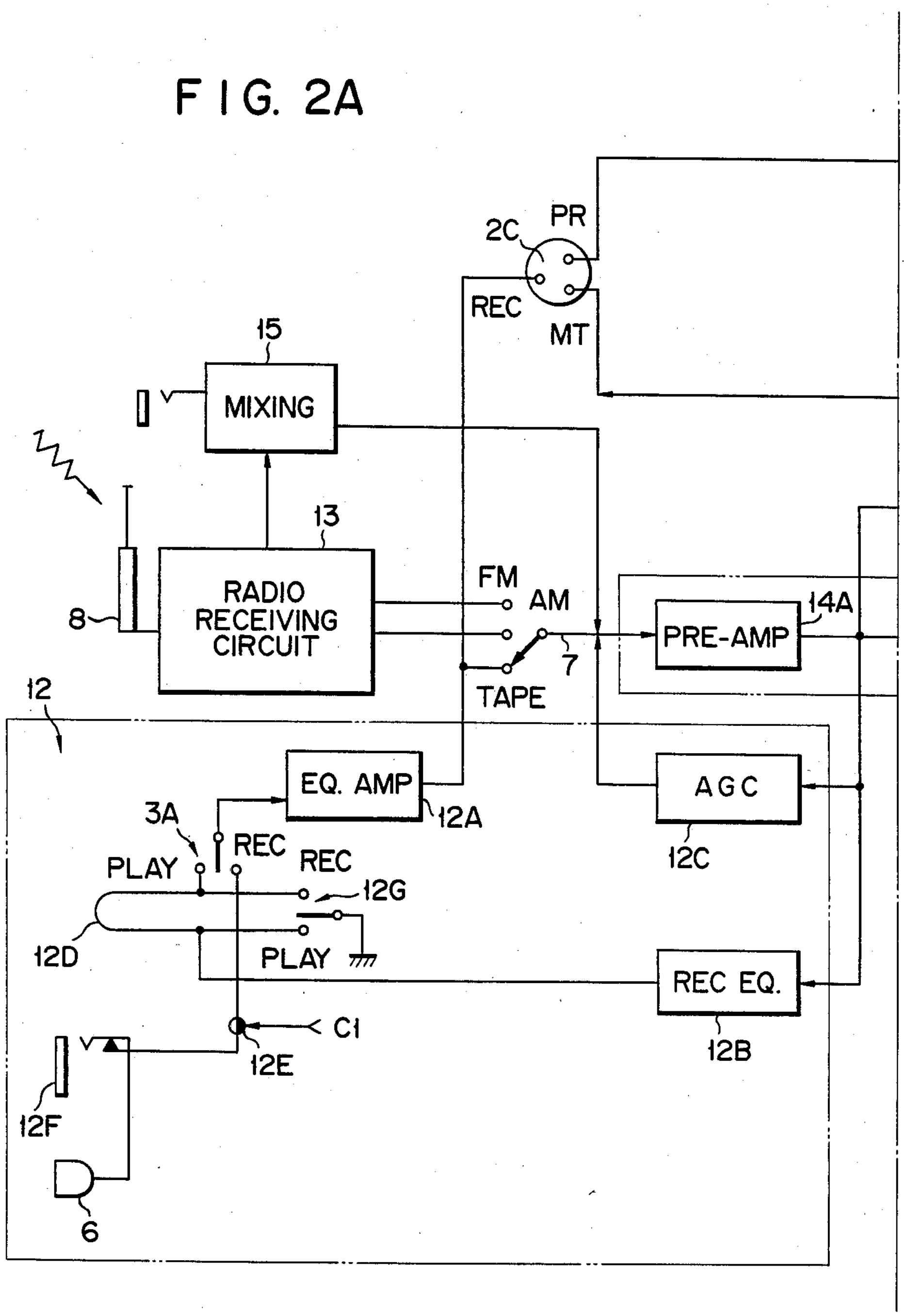
FIGS. 2A and 2B are block diagrams showing the circuitry of the electronic musical instrument with tape recorder shown in FIG. 1.
Figure 2B:
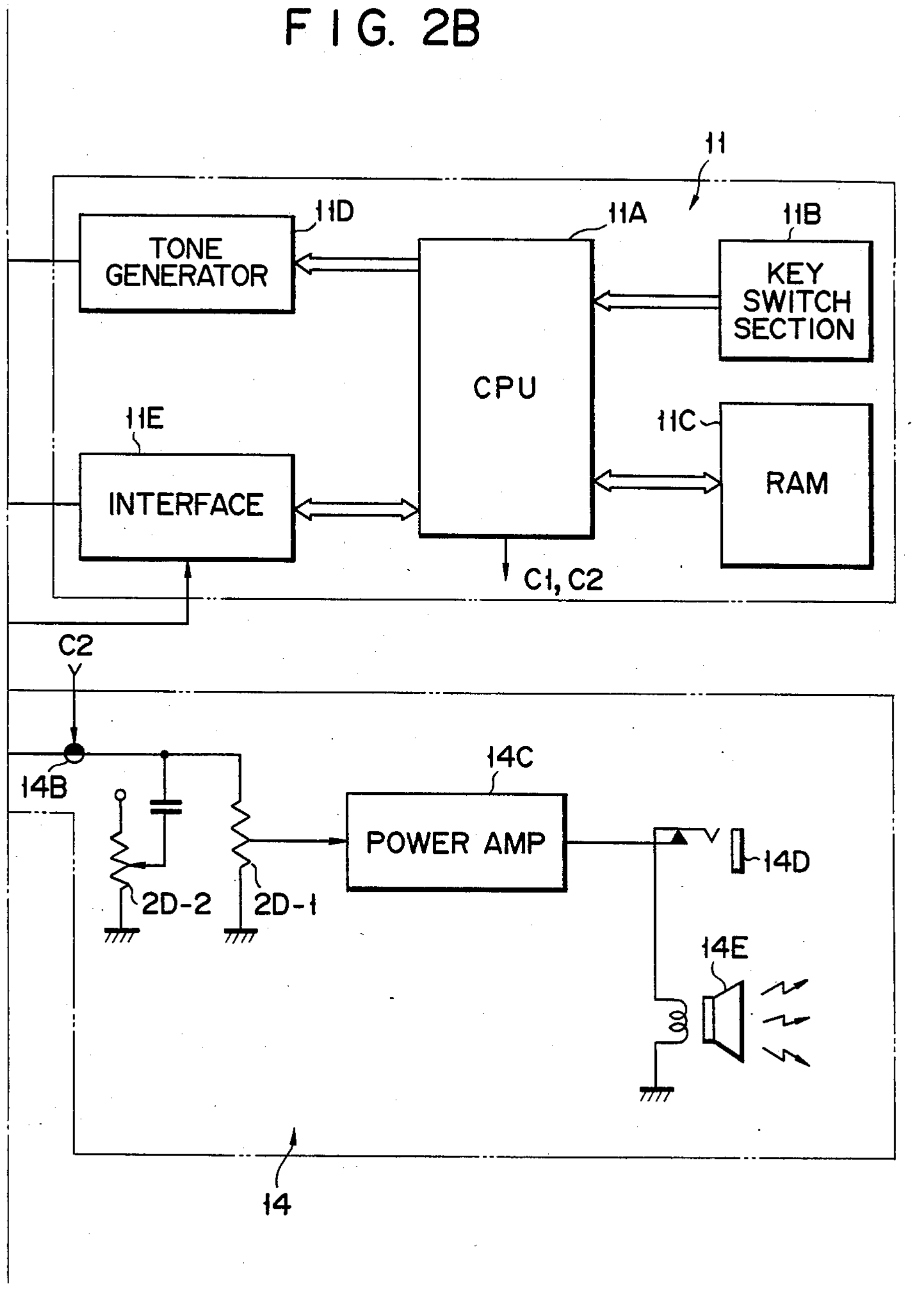

The circuitry of the embodiment will now be described with reference to FIG. 2. The circuit of FIG. 2 mainly comprises an electronic musical instrument circuit 11, a cassette tape recorder circuit 12, a radio receiver circuit 13 and an acoustic transducer circuit 14. The electronic musical instrument circuit 11 includes a CPU (central processing unit) 11A. It also includes a key switch section 11B, a RAM 11C, a tone generating section 11D and an interface 11E, these being coupled through respective bus lines to the CPU 11A. The CPU 11A can control all the operations of the electronic musical instrument section 2 for generating music. Also, it can control the operations of the cassette tape recorder section 3 and radio receiver section 4. It consists of one or more microprocessors. The key switch section 11B has the play key group 2A, chord designation key group 2B and second mode switch 2C, these being provided in the electronic musical instrument section 2. The RAM 11C can store tone data coupled from the key switch section 11B and also tone data loaded from the magnetic tape of the cassette tape recorder section 3. The tone data that is stored in the RAM 11C in the above manner, may be saved in the magnetic tape or supplied to the acoustic transducer circuit 14 for sounding. The tone generating section 11D is a circuit, which can generate tones according to data supplied from the key switch section 11B or data read out from the RAM 11C. Tone signals generated from the tone generating section 11D are coupled through the second mode switch 2C and first mode switch 7 to the acoustic transducer circuit 14 for sounding. The interface 11E is a circuit connected between the CPU 11A and cassette tape recorder circuit 12. It may be constructed on the basis of, for instance, the Kansus City Standard System, and a similar technology is disclosed in Japanese Patent Application No. 55-77845 filed by the same assignee as the present invention. This interface circuit will be described later in detail.

The cassette tape recorder circuit 12 includes two equalizers 12A and 12B and an AGC (automatic gain control) 12C. A magnetic head 12D which is in contact with the magnetic tape can be connected through a terminal PLAY of the switch group 3A to the equalizer 12A. Tone data reproduced from the magnetic tape can be coupled through the equalizer 12A and a terminal TAPE of the first mode switch 7 to the acoustic transducer circuit 14 for tape play. It also can be transferred through the equalizer 12A and a terminal MT of the second mode switch 2C to the RAM 11C to be stored in the same. The internal microphone 6 and an external microphone terminal 12F are connected through a transfer gate 12E and a terminal REC of the switch group 3A to the equalizer 12A. Speech signal from the internal microphone 6 or external microphone thus can be recorded on the magnetic tape. The transfer gate 12E is on-off controlled by a control signal C1 provided from the CPU 11A. The equalizer 12B has its output connected to the magnetic head 12D. It supplies a signal, the recording level of which is automatically determined by the AGC 12C, to the magnetic tape for recording therein. The switch section 12G selectively grounds the terminal REC or terminal PLAY in an interlocked relation to the switch group 3A.

Signals intercepted by the antenna 8 (including signals from a wireless microphone) are coupled to the radio receiver circuit 13. The output of the radio receiver circuit 13 is coupled through a terminal A1 or FM of the first mode switch 7 to the acoustic transducer circuit 14 for reproducing an AM or FM broadcast program. Further, a signal from a wireless microphone is coupled through the radio receiver circuit 13 to the mixing circuit 15. The mixing circuit 15 can also receive a signal from a mixing microphone (not shown), and its output is fed to the acoustic transducer circuit 14 for sounding.

The acoustic transducer circuit 14 includes a pre-amplifier 14A, the volume controls 2D-2 and 2D-1 as noted above which are connected in parallel through a transfer gate 14B to the output side of the preamplifier 14A, a power amplifier 14C connected to the output side of the volume control 2D-1, and a loudspeaker 14E for receiving the output of the power amplifier 14C through a headphone jack 14D for sounding music or the like. These components of the acoustic transducer circuit 14 are of well-known constructions, so that they are not described. The transfer gate 14B is on-off controlled by the control signal C2 from the CPU 11A.

The operation of this embodiment will now be described along with the procedure of the operation. First, the case of using the embodiment as radio receiver will be described. In this case, the first mode switch 7 is set to the terminal AM or FM. A broadcast signal intercepted by the antenna 8 and coupled to the radio receiver circuit 13 is fed through the terminal AM or FM to the pre-amplifier 14A for amplification to a predetermined level. The output of the pre-amplifier 14A is fed through the transfer gate 14B, which is in an enabled state, to the volume controls 2D-2 and 2D-1 for the control of the overall volume and tone value, and then power-amplified in the power amplifier 14C to be sounded from a headphone or the loudspeaker 14E (i.e., sounding section 5) as the AM or FM program.

Now, the case of using the embodiment as a cassette tape recorder will be taken. In this case, the first mode switch 7 is set to the terminal TAPE. Also, the switch group 3A is set to the terminal PLAY by depressing a play mode button. The magnetic head 12D thus reads out data from the magnetic tape. The data read out is coupled through the equalizer 12A and terminal TAPE to the acoustic transducer circuit 14 for sounding as music or the like. At this time, a signal from a mixing microphone can be coupled through the mixing circuit 15 to the acoustic transducer circuit 14. Thus, it is possible to enjoy singing a song to the music reproduced.

For recording data on the magnetic tape, the first mode switch 7 is set to the terminal TAPE, and then the switch group 3A is set to the terminal REC by depressing a record mode button. The transfer gate 12E is in the enabled state at this time. Thus, a speech signal coupled from the internal microphone 6 or an external microphone is coupled through the equalizer 12A and terminal TAPE to the pre-amplifier 14A. The output of the pre-amplifier 14A is coupled through the equalizer 12B and magnetic head 12D to the magnetic tape to be recorded in the same. The output of the pre-amplifier 14A is fed back through the AGC 12C for gain control to maintain a satisfactory recording state.

The case of using the embodiment as an electronic musical instrument will now be described. In this case, the first mode switch 7 is set to the terminal TAPE, and then the second mode switch 2C is set to the terminal PR. In this way, the ordinary play mode is set. In this mode, tone data corresponding to play keys manually operated in the play key group 2A and sounding instruction data corresponding to the states of the other keys and switches, are provided from the CPU 11A to be applied to the tone generating section 11D. The tone generating section 11D generates corresponding tone signals which are coupled through the terminal PR (FIG. 2) of the second mode switch 2C and the terminal TAPE of the first mode switch 7 (FIG. 2) to the acoustic transducer circuit 14 for sounding. The manual play is obtained in the above way. This manual play also can be obtained while listening to the auto-play of melody and/or chord that may be produced simultaneously, for instance according to melody or chord tone data read out from the RAM 11C and coupled through the CPU 11A to the tone generating section 11D.

For storing melody or chord tone data in the RAM 11C using the play key group 2A and chord designation key group 2B, the second mode switch 2C is set to the terminal REC while the first mode switch 7 is at the terminal TAPE. In this state, melody and/or chord tone data that can be obtained by operating the play key group 2A and other keys and switches can be progressively written in the RAM 11C. In this case, the input tone data is displayed on the display section 2E and is also sounded so that it can be confirmed.

Now, the case of saving the tone data that has been stored in the RAM 11C in the manner as described above in the magnetic tape will be described. First, the first mode switch 7 is set to the terminal TAPE, and then the second mode switch 2C is set to the terminal MT. Then, the switch group 3A is set to the terminal REC, and the save key 2F-1 is turned on. Now, the tone data stored in the RAM 11C is progressively read out and coupled through the CPU 11A, interface 11E, terminal MT of the second mode switch 2C, terminal TAPE of the first mode switch 7, pre-amplifier 14A, equalizer 12B and magnetic head 12D to the magnetic tape to be recorded in the same. At this time, the transfer gate 14B is in the disabled state. Thus, a frequency signal that is obtained as a result of conversion of the tone data read out from the RAM 11C in compliance with the Kansus City Standards will never be sounded from the loudspeaker 14E.

Now, the converse case of loading the data reproduced from the magnetic tape into the RAM 11C will be described. In this case, after setting the first mode switch 7 to the terminal TAPE and the second mode switch 2C to the terminal MT, the load key 2F-2 is turned on, and then the switch group 3A is set to the terminal PLAY. Now, data read out from the magnetic tape is coupled through the equalizer 12A, terminal TAPE of the switch 7, pre-amplifier 14A, interface 11E and CPU 11A to the RAM 11C to be loaded in the same. Again in this case, the transfer gate 14B is held disabled, so that there is no possibility of the sounding of frequency signals from the magnetic tape.

Figure 3:
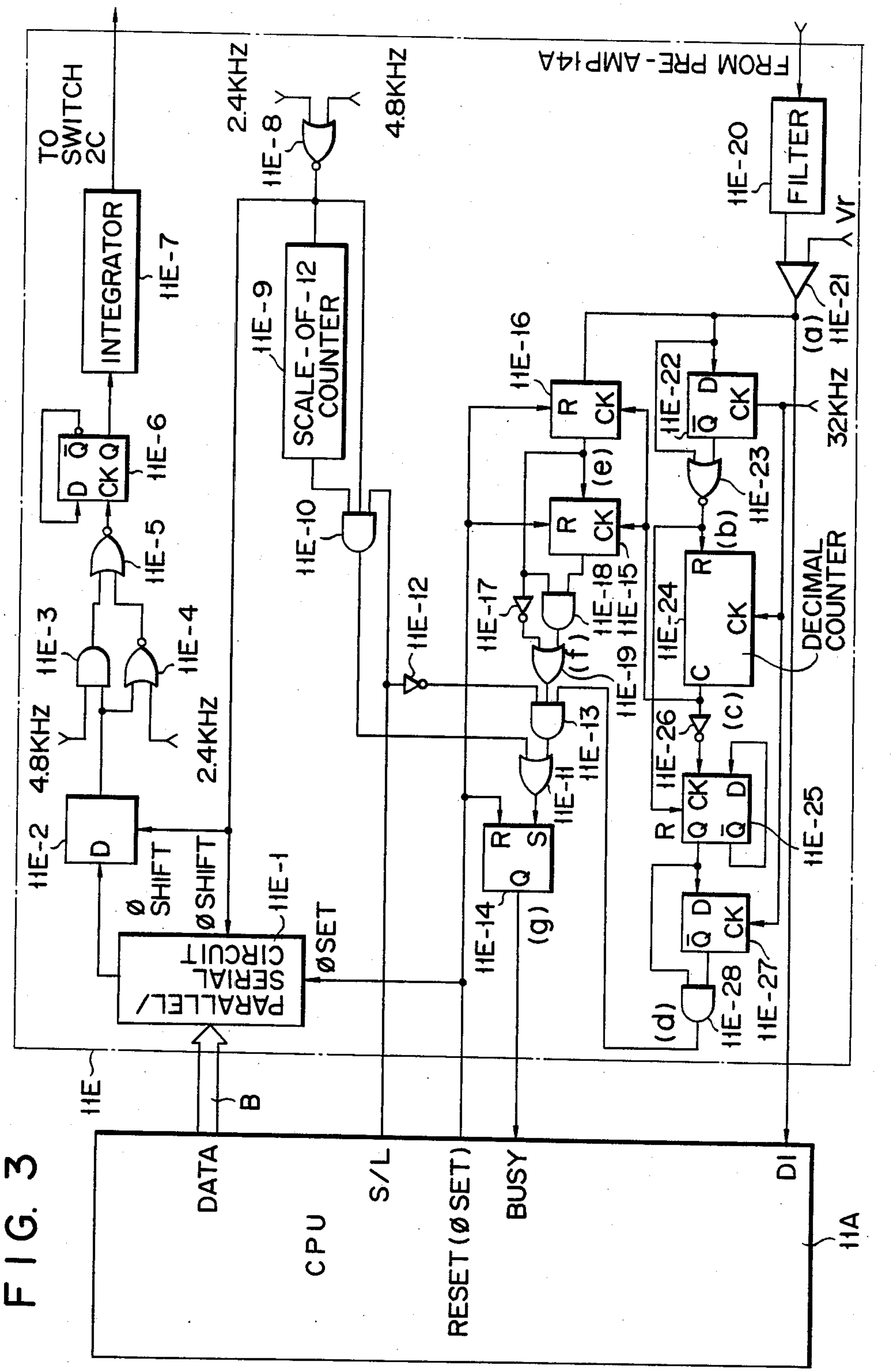
FIG. 3 is a schematic representation of an interface section in the circuitry of FIG. 2.

The construction and operation of the interface 11E will now be described. Referring to FIG. 3, 12-bit data which is to be saved from the RAM 11C to the magnetic tape is transferred from the CPU 11A through a data bus B to a parallel/serial circuit 11E-1 for conversion to serial data. The serial data is fed to a flip-flop 11E-2, and the output therefrom is fed to one input terminal of an AND gate 11E-3 and also to one input terminal of a NOR gate 11E-4. A 4.8-kHz pulse signal is supplied to the other input terminal of the AND gate 11E-3, while a 2.4-kHz pulse signal is supplied to the other input terminal of the NOR gate 11E-4. The outputs of the two gates 11E-3 and 11E-4 are fed through a NOR gate 11E-5 to a flip-flop 11E-6. The output of the flip-flop 11E-6 is integrated in an integrator 11E-7. The output of the integrator 11E-7 is applied to the terminal MT of the switch 2C.

The parallel/serial circuit 11E-1 and flip-flop 11E-2 are operated in synchronism to a $\phi$-shift signal. The $\phi$-shift signal is formed by a NOR gate 11E-8, which receives the 2.4- and 4.8-kHz pulse signals. It is also supplied to a scale-of-12 counter 11E-9 and an AND gate 11E-10. To the AND gate 11E-10 are also fed a carry signal from the scale-of-12 counter 11E-9 and an S/L (SAVE/LOAD) signal from an S/L terminal of the CPU 11A. The output of this three-input AND gate 11E-10 is fed to one input terminal of an OR gate 11E-11. The S/L signal is also fed through an inverter 11E-12 to one input terminal of a three-input AND gate 11E-13. The output of the AND gate 11E-13 is fed to the other input terminal of the OR gate 11E-11. The output of the OR gate 11E-11 is fed to a set input terminal of a flip-flop 11E-14. The set output Q of the flip-flop 11E-14 is fed to a BUSY terminal of the CPU 11A.

A $\phi$-set signal generated by CPU 11A is supplied to the reset terminal of the flip-flop 11E-14. The $\phi$-set signal is supplied also to the parallel/serial circuit 11E-1 and the reset terminals of two flip-flops 11E-15 and 11E-16.

An output signal from the flip-flop 11E-16 is supplied to the flip-flop 11E-15, an inverter 11E-17 and one input terminal of a two-input AND gate 11E-18. An output of the flip-flop 11E-15 is supplied to the other input terminal of the AND gate 11E-18. Output signals from the inverter 11E-17 and AND gate 11E-18 are supplied to an OR gate 11E-19, the output signal of which is supplied to one input terminal of a two-input AND gate 11E-13.

Data to be loaded into the RAM 11C from the magnetic tape are supplied from the pre-amplifier 14A (FIG. 2) to one input terminal of a comparator 11E-21 through a filter 11E-20. The other input terminal of the comparator 11E-21 is connected to a reference voltage source Vr. An output from the comparator 11E-21 is supplied to the input terminals of flip-flops 11E-16 and 11E-22, the DI terminal of the CPU 11A and one input terminal of a NOR gate 11E-23. The other input terminal of the NOR gate 11E-23 receives an output signal from the flip-flop 11E-22. An output from the NOR gate 11E-23 is supplied to the reset terminal of a decimal counter 11E-24 and the reset terminal of a flip-flop 11E-25. A carry signal from the decimal counter 11E-24 is supplied to the CK terminal of the flip-flop 11E-25 through an inverter 11E-26 and to the CK terminals of the flip-flops 11E-15 and 11E-16. Q output signal from the flip-flop 11E-25 is supplied to the input terminal of a flip-flop 11E-27 and one input terminal of a two-input AND gate 11E-28. The other input terminal of the AND gate 11E-28 receives a $\overline{Q}$ output signal from the flip-flop 11E-27. An output signal from the AND gate 11E-28 is supplied to the third input terminal of the AND gate 11E-13. A $\overline{Q}$ output signal from the flip-flop 11E-25 is fed back to the D input terminal of the flip-flop 11E-25. A clock pulse signal of 32 kHz is supplied to the CK terminals of the flip-flop 11E-22, flip-flop 11E-27 and decimal counter 11E-24.

Assume that data representing a printed score of a musical composition are loaded into the RAM 11C and then read therefrom to be saved on a magnetic tape. In this case, the interface 11E operates in the following manner.

Figure 4:
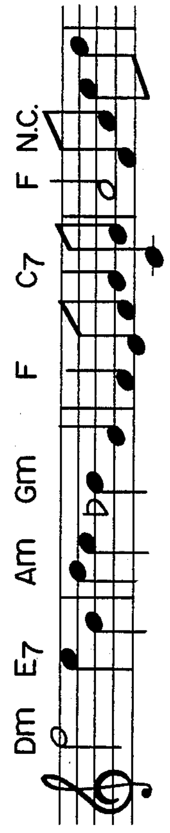
FIG. 4 is a view showing part of a music score.
Figure 5:
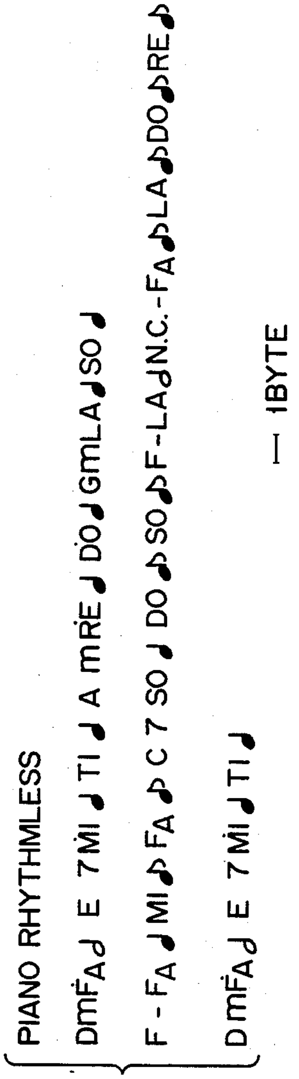
FIG. 5 is a view showing a symbol expression of the tone data of the score of FIG. 4.

The score of FIG. 4 can be written in a form as shown in FIG. 5. In the data of FIG. 5, tone color designation data is first provided, and then rhythm designation data is provided. In this example, piano is designated as the tone color, while no rhythm designation is given. Subsequent to these data, data representing the notes in the score of FIG. 4 are provided in the same order. Each of the corresponding data consists of chord data, note data and tone length data, these data being provided in the mentioned order. The individual data is expressed either in one byte or in two bytes. For example, for the chord "Dm" one byte is used for "D", and another byte is used for "m". Note "FA" is expressed in one byte. The chord "FA" with upper dot "·" is in the upper octave than the chord "FA" with no dot.

Figure 6:
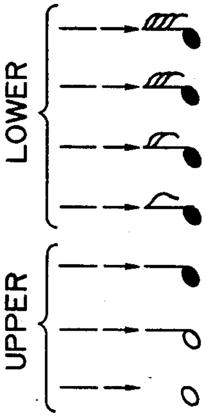
FIG. 6 is a view showing a tone length format.
Figure 8:
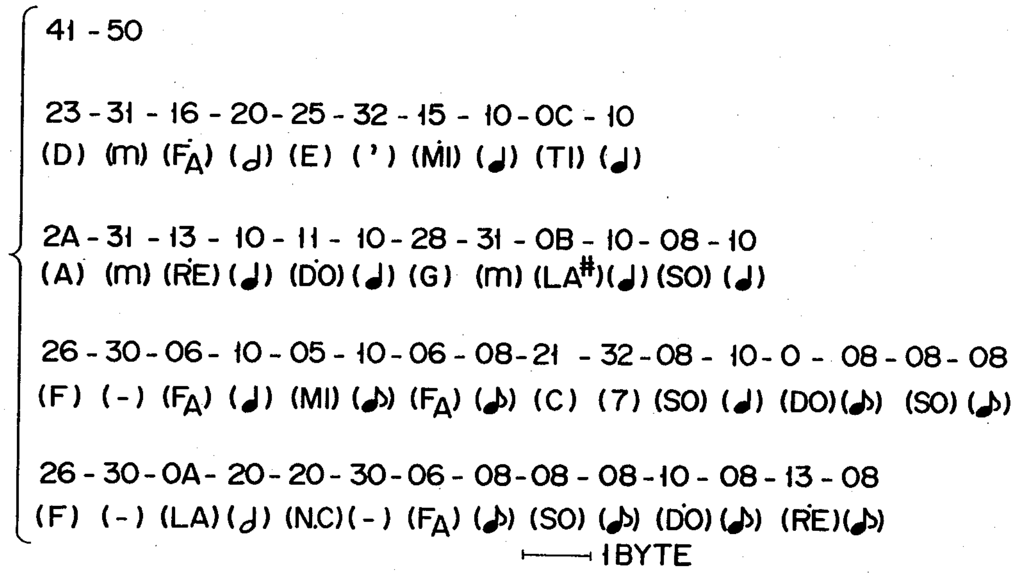
FIG. 8 is a view showing codes of tone data expression of FIG. 5.

FIG. 6 shows an example of the format of the tone length data. This format consists of 6 bits. The individual bits respectively from the least significant bit when they are "1". FIG. 7 shows a table of an example of the format of tone data other than the tone length data. Here, one-byte data consists of upper 4 bits and lower 4 bits. The upper 4 bits are used to represent numerals "0" to "5", while the lower 4 bits are used to represent numerals "0" to "9" and alphabet letters "A" to "F". The tone data as shown in FIG. 7 thus can be expressed by a total of 8 bits, i.e., the upper 4 bits and lower 4 bits. The tone data shown in FIG. 5 can be written in a form as shown in FIG. 8 using the codes shown in FIGS. 6 and 7. For example, with the tone color designation data that is provided first in the data of FIG. 5, which represent piano, the upper 4 bits in one byte represent numeral "4" while the lower 4 bits represent numeral "1". Thus, numeral "41" is the tone color designation data for piano.

Figure 9:
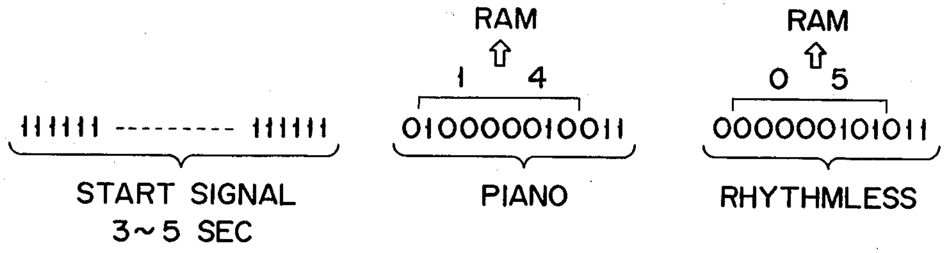
FIG. 9 is a binary code expression of the codes shown in FIG. 8.

The tone data that is transferred between the CPU 11A and interface 11E shown in FIG. 3 has a 12-bit structure, which results by adding a one-bit header before the one-byte data mentioned above and providing a one-bit parity and then a two-bit ender after the one-byte data. FIG. 9 shows a leading portion of the binary version of the data shown in FIG. 8. This data begins with a start signal for 3 to 5 seconds. The start data is all "1" data. It is followed by a header bit of "0". Subsequent to this bit, the 8-bit data representing piano as the tone color is provided, which is followed by a parity bit of "0" and then by two "1" bits constituting the ender. Likewise, subsequent 12-bit tone data are provided successively.

Figure 10:
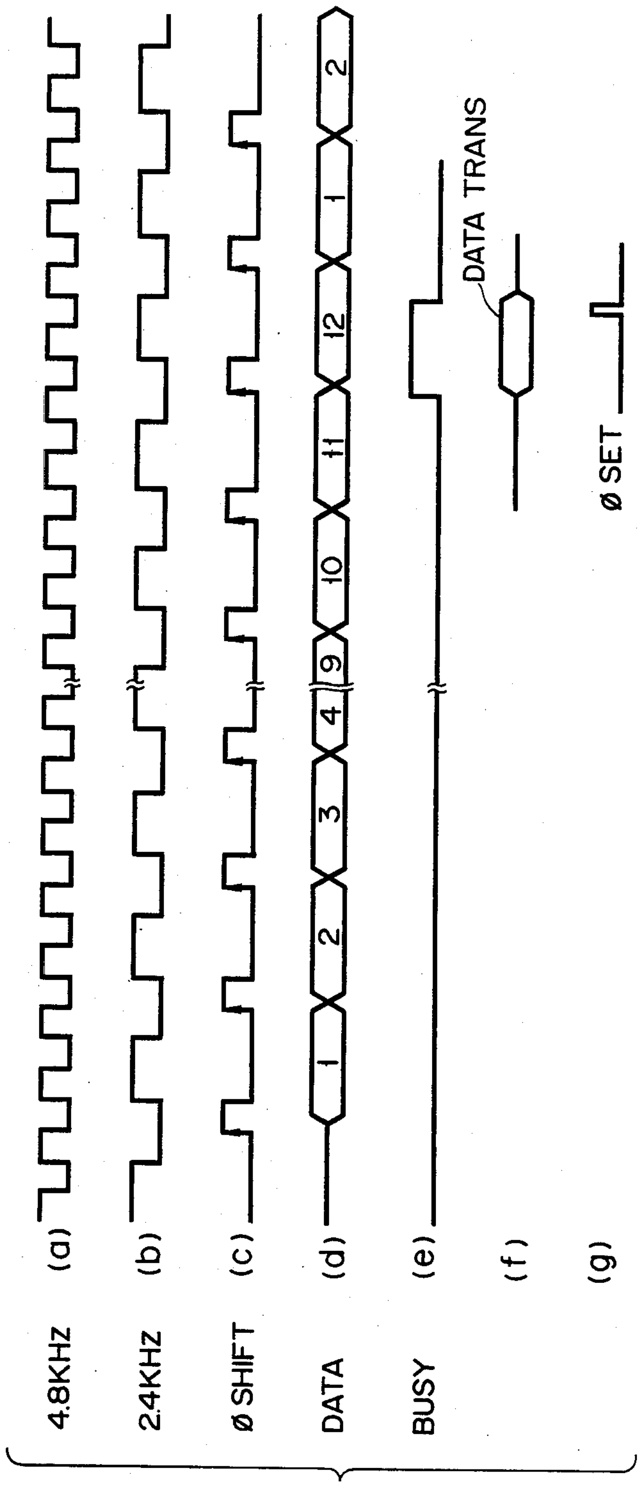
FIG. 10 is a waveform chart for explaining the operation of an interface section shown in FIG. 3.

Now, the save operation of the circuit of FIG. 3 will be described with reference to the time chart of FIG. 10 and the flow chart of FIG. 11. For this operation, the S/L signal from the CPU 11A is "1". A rectangular pulse signal at 4.8 kHz as shown in (a) in FIG. 10 and a rectangular pulse signal at 2.4 kHz as shown in (b) in FIG. 10 are supplied to the NOR gate 11E-8 shown in FIG. 3. The NOR gate 11E-8 thus provides a $\phi$-shift pulse signal as shown in (c) in FIG. 10. The parallel/-serial circuit 11E-1 and flip-flop 11E-2 are operated in synchronism to the rise of the $\phi$-shift signal. The first bit data (1) of the 12-bit data, as shown in (d) in FIG. 10 thus appears from the output side of the flip-flop 11E-2. If this bit data (1) is "1", the output of the NOR gate 11E-4 is "0" so that the 4.8-kHz pulse output is supplied from the AND gate 11E-3 to the NOR gate 11E-5. Thus, a pulse output with a pulse width of one half of 2.4 kHz, i.e., 4.8 kHz, is obtained from the output side of the flip-flop 11E-6, and it is converted in the integrator 11E-7 into a sinusoidal wave which is directed to the switch 2C. If the first bit data (1) is "0", the output of the AND gate 11E-3 is "0" so that the 2.4-kHz pulse signal is provided from the NOR gate 11E-4 and fed through the NOR gate 11E-5 to the flip-flop 11E-6. Thus, an output at 1.2 kHz is obtained from the flip-flop 11E-6 and fed to the integrator 11E-7 for conversion into the sine wave.

When 12 $\phi$-shift pulses are provided from the NOR gate 11E-8, a carry signal is supplied from the scale-of-12 counter 11E-9 to the three-input AND gate 11E-10. As a result, the flip-flop 11E-14 is set, and its Q output is supplied to the BUSY terminal of the CPU 11A as shown in FIG. 10(*e*). The CPU 11A thus transfers the next 12-bit data to the parallel/serial circuit 11E-1.

Now, the operation of saving of the actual data shown in FIG. 9 will be described with reference to the flow chart of FIG. 11. When an operation for saving data is done, the start signal "111 . . . 111" is saved for 3 seconds, before a data is read out from the RAM 11C. If a baud rate is set as 1,200 bits/sec., 3,600 bits of "1" are saved. This means that a 2.4-kHz unit signal consisting of 12 bits of "1" is transferred 300 times through the switch 2C to the magnetic tape. Subsequently, the CPU 11A reads out the one-byte tone color designation data for piano from the RAM 11C and prepares the 12-bit data by adding the header, parity and ender. After the subsequent appearance of a busy signal, the first data of the tone color designation data is transferred to the magnetic tape. Subsequently, the address of the RAM 11C is incremented, and the next data, i.e., the rhythm designation data, is saved into the magnetic tape in the manner as described. In this way, all the data stored in the RAM 11C is saved into the magnetic tape.

The steps of the save operation described above are shown in the flow chart of FIG. 11.

How data are loaded into the RAM 11C from the magnetic tape by the circuit of FIG. 3 will now be described with reference to FIGS. 12 and 13. First, the S/L signal from the CPU 11A falls to level "0". The output from the inverter 11E-12 therefore rises to level "1", thus opening the AND gate 11E-13. The data, or signals reproduced from the magnetic tape, are amplified by the pre-amplifier 14A to have a predetermined level. Noise is removed from these signals by the filter 11E-20, and the signals are thus wave-shaped. The output signals from the filter 11E-20 are supplied to the comparator 11E-21. The comparator 11E-21 converts the input sine wave signal to a pulse signal as illustrated in FIG. 12(*a*).

Figure 12:
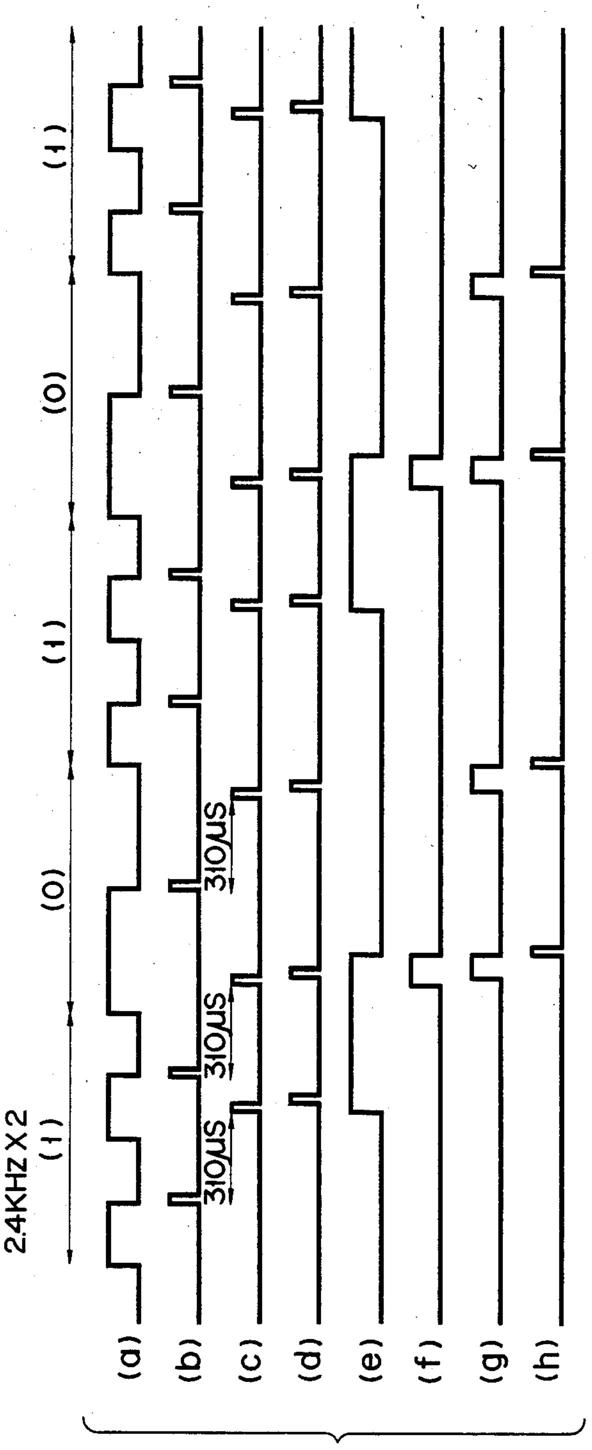
FIG. 12 is a waveform chart for explaining the operation of the interface section.

The first item of data which is read from the magnetic tape is a pulsative start signal of 2.4 kHz as shown in the left side of FIG. 12(*a*). This start signal consists of "1" bits. The start signal is a series of "1" bits. The start signal of 2.4 kHz is supplied to the one-shot circuit which is comprised of the flip-flop 11E-22 and the NOR gate 11E-23. The one-shot circuit converts the start signal to a pulse signal consisting of extremely narrow pulses as shown in FIG. 12(*b*), in synchronism with the trailing edges of the pulses of the start signal.

The pulse signal shown in FIG. 12(*b*) resets the decimal counter 11E-24. The decimal counter 11E-24 generates a carry signal as shown in FIG. 12(*c*) every time it counts 10 clock pulses of 32 kHz. After the decimal counter 11E-24 is reset by the output signal from the NOR gate 11E-23, about 310 $\mu$sec elapses until the decimal counter 11E-24 generates a carry signal.

The carry signal from the decimal counter 11E-24 is inverted by the inverter 11E-26 and supplied to the flip-flop 11E-25, thereby setting the flip-flop 11E-25. A Q output signal from the flip-flop 11E-25 is supplied to the pulse generating circuit comprised of the flip-flop 11E-27 and the AND gate 11E-28. The AND gate 11E-28 generates narrow pulses shown in FIG. 12(*d*) which are synchronous with the trailing edges of the carry signal from the decimal counter 11E-24.

If the output signal from the comparator 11E-21 has high level when the counter 11E-24 generates a carry signal, the output signal from the flip-flop 11E-16 rises as shown in FIG. 12(e). When the counter 11E-24 generates the next carry signal in this state, the flip-flop 11E-15 is set and the output signal from the AND gate 11E-18 also rises as shown in FIG. 12(*f*). The output signal from the AND gate 11E-18 is supplied to the AND gate 11E-13 via the OR gate 11E-19, and the output signal from the AND gate 11E-13 is supplied to the flip-flop 11E-14 through the OR gate 11E-11. The flip-flop 11E-14 is therefore set and generates a Q output signal as shown in FIG. 12(*g*). This Q output signal is supplied to the busy terminal of the CPU 11A. In response to the Q output signal the CPU 11A starts reading data. Upon completion of data-reading, the CPU 11A generates a $\phi$-set signal from its reset terminal at such times as illustrated in FIG. 12(*h*). As a result, the flip-flops 11E-14, 11E-15 and 11E-16 are reset. The signals shown in FIGS. 12(*e*), 12(*f*) and 12(*g*) therefore fall as the $\phi$-set signal rises.

As shown in FIG. 9, the first "0" which follows the start signal, i.e., series of "1" bits, is the first bit of musical data. The CPU 11A therefore divides the musical data consisting of this "0" bit (header) and other bits following this "0" into groups each consisting of 12 bits and then performs parity check on each group. If the parity check shows that the musical data are correct, one byte of data is written into the RAM 11C. In this way the data read from the magnetic tape are loaded into the RAM 11C one by one. FIG. 13 is a flow chart illustrating how to load musical data into the RAM 11C.

While the above embodiment has employed a monoral cassette tape recorder, it is of course possible to incorporate a stereo cassette tape recorder. Further, in such a case, it is possible to produce the play sound in stereo (that is, it is possible to provide for a desired acoustical orientation).

As has been shown, with the electronic musical instrument according to the invention, which incorporates a tape recorder and also a radio receiver, music data can be stored in a great quantity for a long period of time in a magnetic tape or the like, and automatic play of a large number of numbers can be easily obtained. In addition, excellent sound quality can be obtained in such case because the data is coupled through the tone generator in the electronic musical instrument for sounding. Further, it is possible to select many tone colors. Still further, sound input to a microphone and music from the magnetic tape or electronic musical instrument section can be readily mixed, so that it is possible to sing songs to the auto-play music. Moreover, the acoustic transducer comprising the amplifier, loudspeaker and so forth can be commonly used for the tape recorder, electronic musical instrument and radio receiver. Thus, the circuit construction can be simplified to reduce cost.

According to the invention, tone data of a plurality of music numbers, e.g., tens to hundreds of numbers, can be recorded as digital data on a magnetic tape which has a large capacity. This means that it is possible to quickly select a desired number among the recorded numbers for playback.

Further, according to the invention titles of a large number of music numbers recorded on a magnetic tape can also be recorded as speech data thereon so that a desired number can be selected by inputting the title of the desired number in voice.

Figure 14:
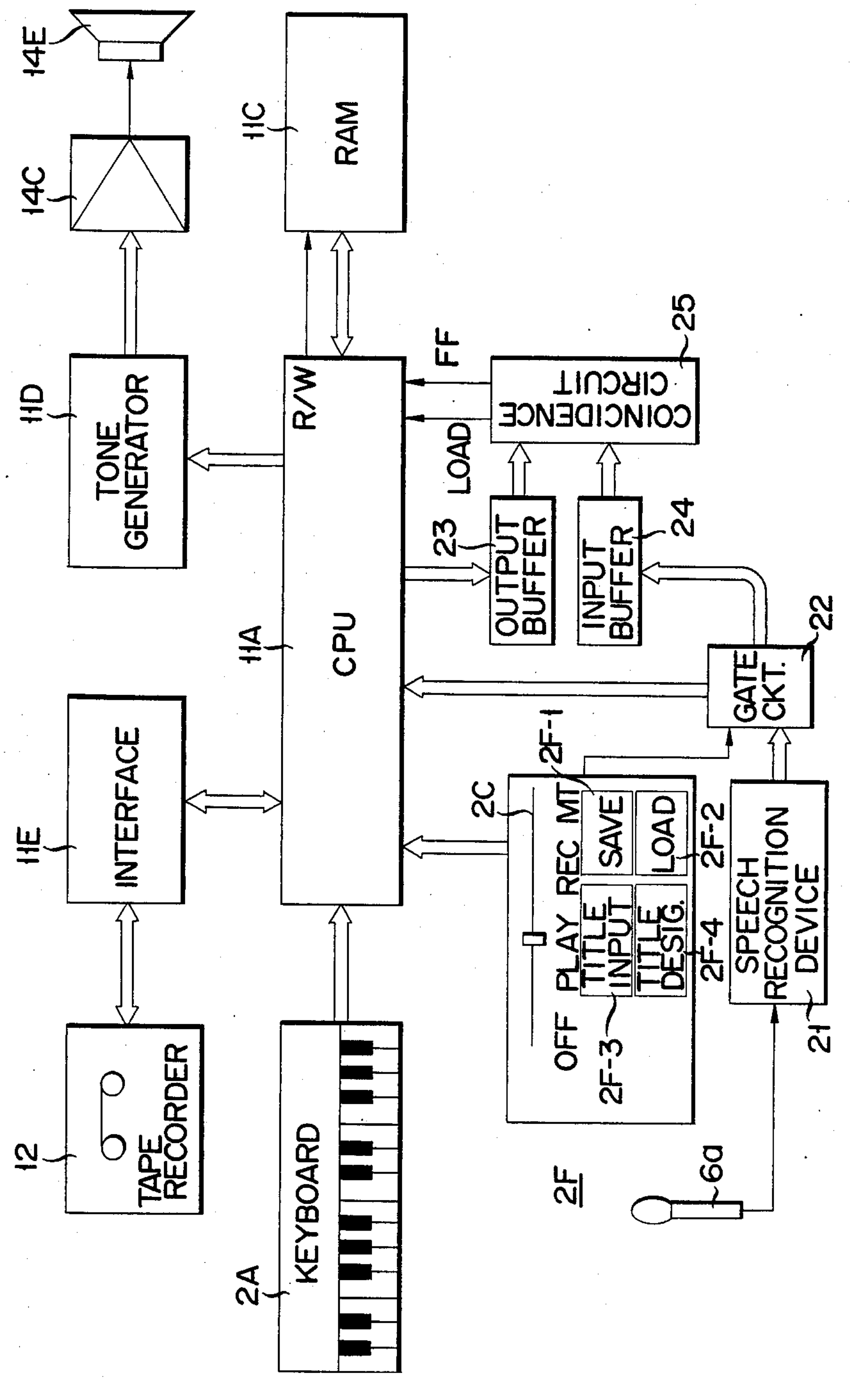
FIG. 14 is a block diagram showing a different embodiment of the invention.
Figure 15:
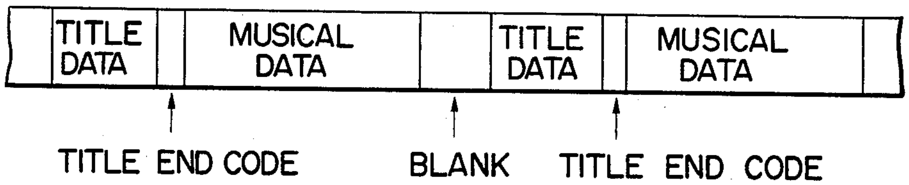
FIG. 15 is a view showing a recording data format of a tape recorder.
Figure 16:
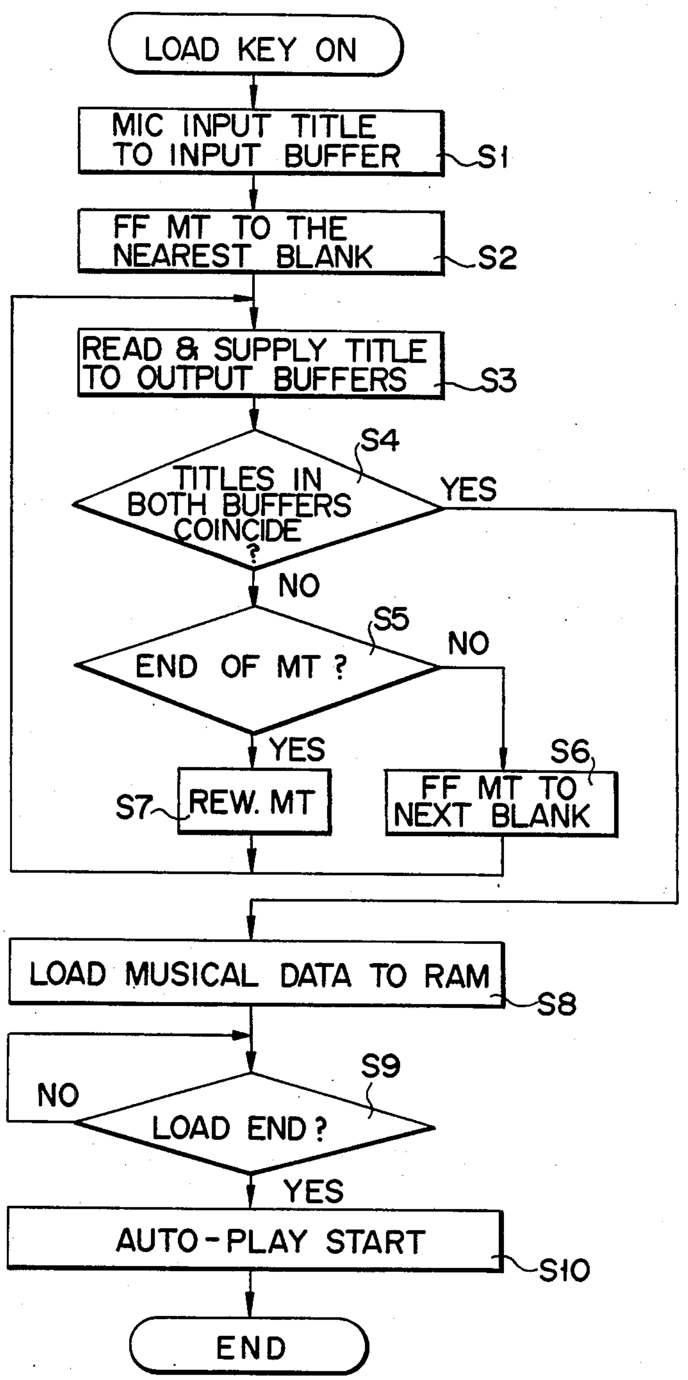
FIG. 16 is a flow chart for explaining the operation of the embodiment of FIG. 14.

This is realized as an embodiment shown in FIGS. 14 through 16, which will now be described. In these Figures, like parts as those in FIGS. 1 through 13 are designated by like reference numerals and symbols. Referring to FIG. 14, which shows the circuitry of the embodiment, a control key group 2F includes a title input key 2F-3 and a title designation key 2F-4 as well as a save key 2F-1 and a load key 2F-2. The title input key 2F-3 is used when storing a number title input. The title designation key 2F-4 is used when selecting a title of a recorded number of music. In this embodiment, the title can be input and designated as a speech. Tone data provided from a keyboard 2A and signals from a key switch section 2 are coupled to a CPU 11A.

The electronic musical instrument includes a hand microphone 6*a* which can be removably coupled. A speech signal input from the microphone 6*a* is coupled to a speech recognition device 21 for conversion to digital speech data which is in turn coupled through a gate 22 to the CPU 11A. The gate 22 passes the speech data in the MT mode as described earlier whenever a gate control signal is produced from the key switch section 2F with the operation of a particular key.

The CPU 11A can provide a read/write signal R/W to a RAM 11C for controlling the read/write operation thereof. It is also interconnected with the RAM 11C via a data bus line. The RAM 11C can store tone data from the keyboard 2A, speech data from the microphone 6*a* and various record data loaded from a magnetic tape in a cassette tape recorder section 12. The data stored in the RAM 11C can be saved into the magnetic tape or it can be coupled through the tone generator 11D and an amplifier 14C to a loudspeaker 14E for sounding. Of the various record data stored in the magnetic tape of the cassette tape recorder section 12, the speech data is transferred through an interface 11E and the CPU 11A to an output buffer 23 to be stored in the same. The data in the output buffer 23 is fed together with the data in an input buffer 24, which memorizes the output data of the gate 22, to a coincidence circuit 25. The coincidence circuit 25 detects the coincidence of the data from both the buffers 23 and 24. If it detects a coincidence, it produces a load signal LOAD. When the two input data do not coincide, it provides a fast feed signal FF. Both the signals LOAD and FF are fed to the CPU 11A.

The operation of the embodiment will now be described. First, a case of recording data on the magnetic tape of the tape recorder section 12 is taken. The title input key 2F-3 is depressed with the mode switch 2C in the position REC. Then, the title of a number to be recorded is input in speech from the microphone 6*a*. The microphone 6*a* thus supplies a speech signal to the speech recognition device 21. The speech recognition device 21 converts the input speech signal into digital speech data, which is supplied to the CPU 11A to be written in a designated address area of the RAM 11C. When a predetermined period of time has passed after the coupling of the title, the CPU 11A supplies a title end code to the RAM 11C. This code is written subsequent to the title data. Then, tone data of the music number of that title to be recorded can be written in the RAM 11C by manually playing the number on the keyboard 2A. The tone data thus input is also coupled to the tone generator 11D and sounded, so that it is possible to confirm that it is accurately input. It is to be understood that a number of music numbers can be recorded successively by inputting the title of each number first and then the tone data of that number. In the RAM 11C, the title data and tone data of the successive music numbers are stored.

To save the title data and tone data stored in the RAM 11C into the magnetic tape in the cassette tape recorder section 12, the mode switch 2C is set to the position MT, and then the save key 2F-1 is depressed. The cassette tape recorder section 12 is thus set in the record mode. In this mode, the CPU 11A reads out the title data from the RAM 11C and transfers it to the interface 11E. The interface 11E converts the input title data into a digital magnetic recording signal. This magnetic recording signal is supplied to the cassette tape recorder section 12 to be recorded on the magnetic tape. When the recording of the title data is completed, the CPU 11A supplies a title end code to the interface 11E. Then, it reads out the tone data of the number, the title data of which has been previously transferred, from the RAM 11C and transfers it to the cassette tape recorder section 12 for recording on the magnetic tape. FIG. 15 shows the data which is recorded on the magnetic tape in the above way. It represents the format of the data stored in the magnetic tape. As is shown, the title data is first recorded, then the title end code and then the tone data for each number of music. That is, a number of sets of data each consisting of the title data, title end code and tone data are recorded for the corresponding numbers of music. In this format, each title data record area is provided subsequent to a blank area (i.e., sound-free area) in which no data is recorded. Each blank area thus is provided between adjacent sets of data.

Now, the operation will be described in connection with a case of loading recorded data of a desired number from the magnetic tape into the RAM 11C by designating the title of that number in speech. To this end, the title designation key 2F-4 is first depressed with the mode switch 2C in the position MT. Then, the title of the number to be loaded is input in speech from the microphone 6*a*, and then the load key 2F-2 is depressed. As a result, a program as shown in the flow chart of FIG. 16 is executed. In a first step S1 of the program, the speech signal from the microphone 6*a* is converted in the speech recognition device 21 into digital data to be transferred as title designation data through the gate 22 to the input buffer 24. Then, a step S2 is executed, in which the magnetic tape is fast fed so that a blank area in the magnetic tape of the cassette tape recorder section 12, which is found to be nearest to the magnetic head 12D (FIG. 1), is brought to the position thereof. In a subsequent step S3, title data is read out from the area subsequent to the blank area noted above of the magnetic head having been fast fed, and is transferred to the output buffer 23. In a subsequent step S4, the data having been transferred to the buffers 23 and 24 are both fed to the coincidence circuit 25 for detecting the coincidence of the two data. If the two data do not coincide, a next step S5 is executed, in which whether there is the trailing end of the magnetic tape is checked. If the tape end is not detected, a step S6 is executed, in which the tape is fast fed by a fast feed signal FF produced from the coincidence circuit 25 until the next blank area is brought to the magnetic head position. It is to be noted that if the title data read out from the tape and the title designation data input by speech do not coincide, the tape is fast fed to the next blank area without reading out the tone and other data corresponding to the readout title data. If the tape end is detected in the step S5, a step S7 is executed, in which the tape is rewound so that the leading end thereof is brought to the magnetic head position. When the fast feed or rewinding of the tape executed depending upon the result of checking of the tape end is completed, the routine goes back to the step S3 so that its portion as described above is repeated. In this way, whether the tone data of the number corresponding to the title designation data input by speech is determined. In the above process, only the title data among the various data recorded in the magnetic tape is loaded while the rest of the data is skipped, so that the search for the desired number of music can be done in a short period of time.

When the coincidence of the data in the buffers 23 and 24 is detected, a "YES" is yielded in the step S4, so that a step S8 is executed. In this step S8, the tone data corresponding to the coincident title designation data is read out from the tape and is loaded into the RAM 11C. Then, a step S9 is executed, in which whether the loading is completed is checked. When the loading is completed, a step S10 is executed, in which the tone data loaded in the RAM 11C is transferred to the tone generator 11D to start the auto-play of that number. It is to be noted that by designating the title of a desired number to be played back from the magnetic tape by speech, only the tone data of that number is loaded for the auto-play and thus the loading time can be reduced.

In the above embodiments the tone data was input by operating the keyboard 2A, but it is also possible to input tone data using a bar code reader. Further, while in the preceding embodiment the title data and tone data were input alternately, it is also possible to input all the title data together so that they are recorded on an initial portion of the magnetic tape. In this case, the search of a desired number to be played back can be done by only continuously reading out the title data recorded on the initial tape portion, and the search time thus can be further reduced. The search of the tone data of the desired number in this case can be accomplished by counting the order number of the pertinent title data and fast feeding the tape by an amount corresponding to the count from the leading end of the tone data record portion.

In the above embodiment, title designation data are input by speech and recorded on the magnetic tape, on which the tone data of the numbers of these titles are also recorded, and only the tone data of a number designated by title designation data input by speech is read out for playback from the magnetic tape. Thus, even if a large number of different numbers of music are recorded on the magnetic tape, auto-play of a desired number among these numbers can be obtained by merely designating the title of that number by speech. The time required for selecting the desired number thus can be reduced very much. Also, the user can input the title by pronouncing it, the content of the input can be confirmed, and the number can be selected easily and accurately.

Figure 17:
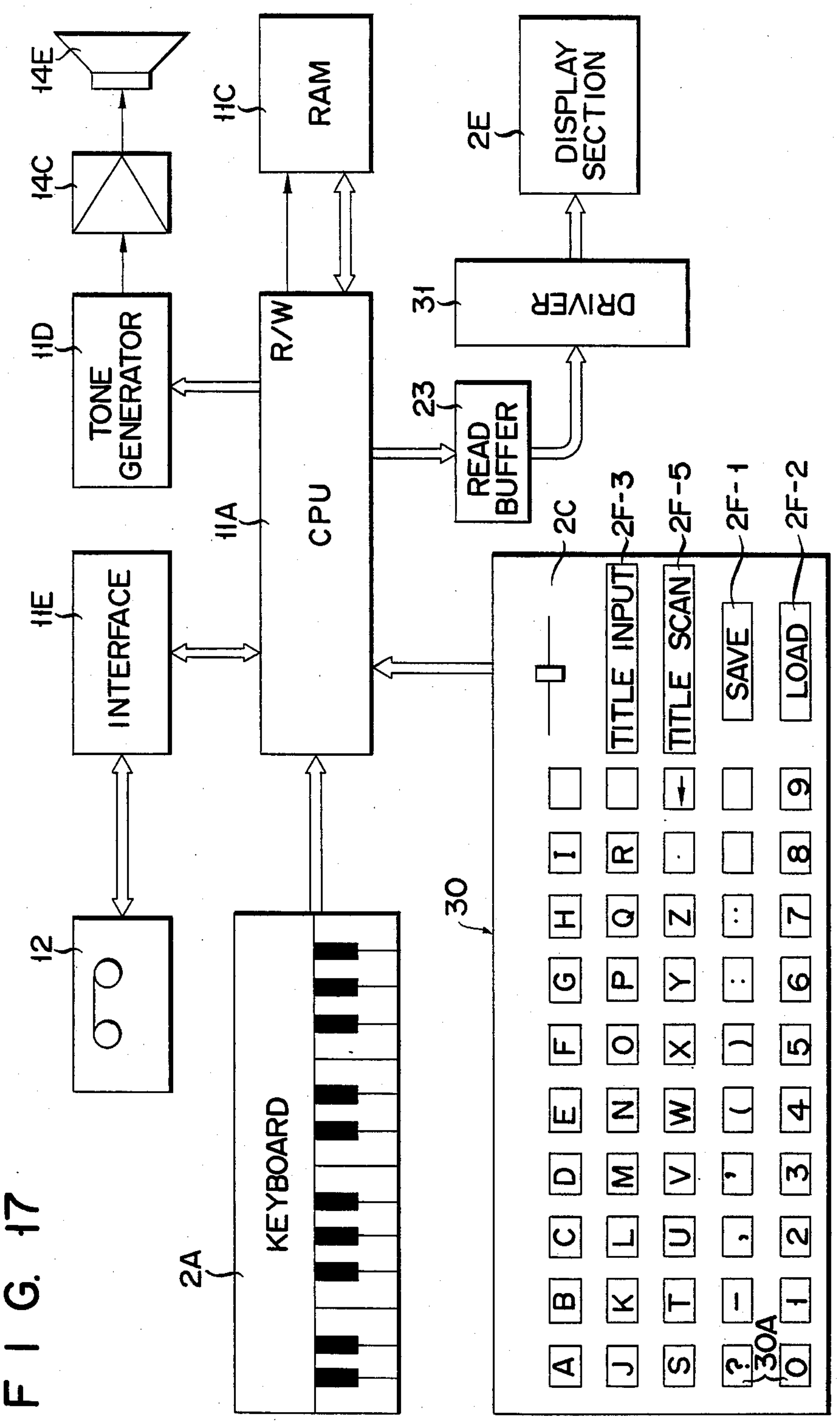
FIG. 17 is a block diagram showing a further embodiment of the invention.

In the preceding embodiment shown in FIG. 14, the title of number was input by speech when recording the numbers and also the title of a desired number was input also by speech to select that number. It is also possible to let number titles be keyed in for recording on a magnetic tape and let the title of a desired number to be selected be also keyed in for searching the number. This is realized in an embodiment shown in FIGS. 17 to 19, which will now be described.

This embodiment has a key input section 30, which includes a key group 30A for coupling words in katakana letters or alphabet letters and also numerals and various symbols as well as a title input key 2F-3, a title scan key 2F-5, a save key 2F-1, a load key 2F-2 and a mode key 2C. The keys in the key group 3A, title input key 2F-3 and save key 2F-1 are used for recording title data and title end code in a cassette tape recorder 12 in a record mode to be described later. The save key 2F-1 and keyboard 2A are used to record tone data in the cassette tape recorder 12. These data can be recorded in the format shown in FIG. 15 as described earlier. They are recorded, for instance, as digital data based on the Kansas City Standard System.

Figure 18:
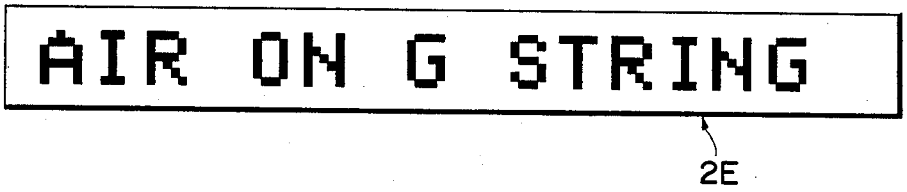
FIG. 18 is a view showing an example of the display on a display section shown in FIG. 17.

The title scan key 2F-5 is used to successively write title data in a buffer 23 by reading out only these data while skipping the tone data stored in the cassette tape recorder 12. The skipping function is controlled by CPU 11A as in the previous embodiment of FIG. 14 following a program to be described later. The title data which is read out by the cassette tape recorder 12 and written in the read buffer 23 is converted by a driver 31 into a display signal for display on display section 2E. This write operation is also brought about when saving title data into the cassette tape recorder 12 by operating the key group 30A, title input key 2F-3 and save key 2F-1. At this time, the title data input is also displayed. The display section 2E displays the title data as a dot matrix display on a liquid crystal display unit as shown in FIG. 18. The transfer of the title data to the read buffer 23 is done through the CPU 11A. When the load key 2F-2 is operated while the title data recorded in the cassette tape recorder 12 is being scanned in response to the operation of the title scan key 2F-5, the tone data pertinent to the title data subsequently read out is also read out and written in RAM 11C.

Figure 19:
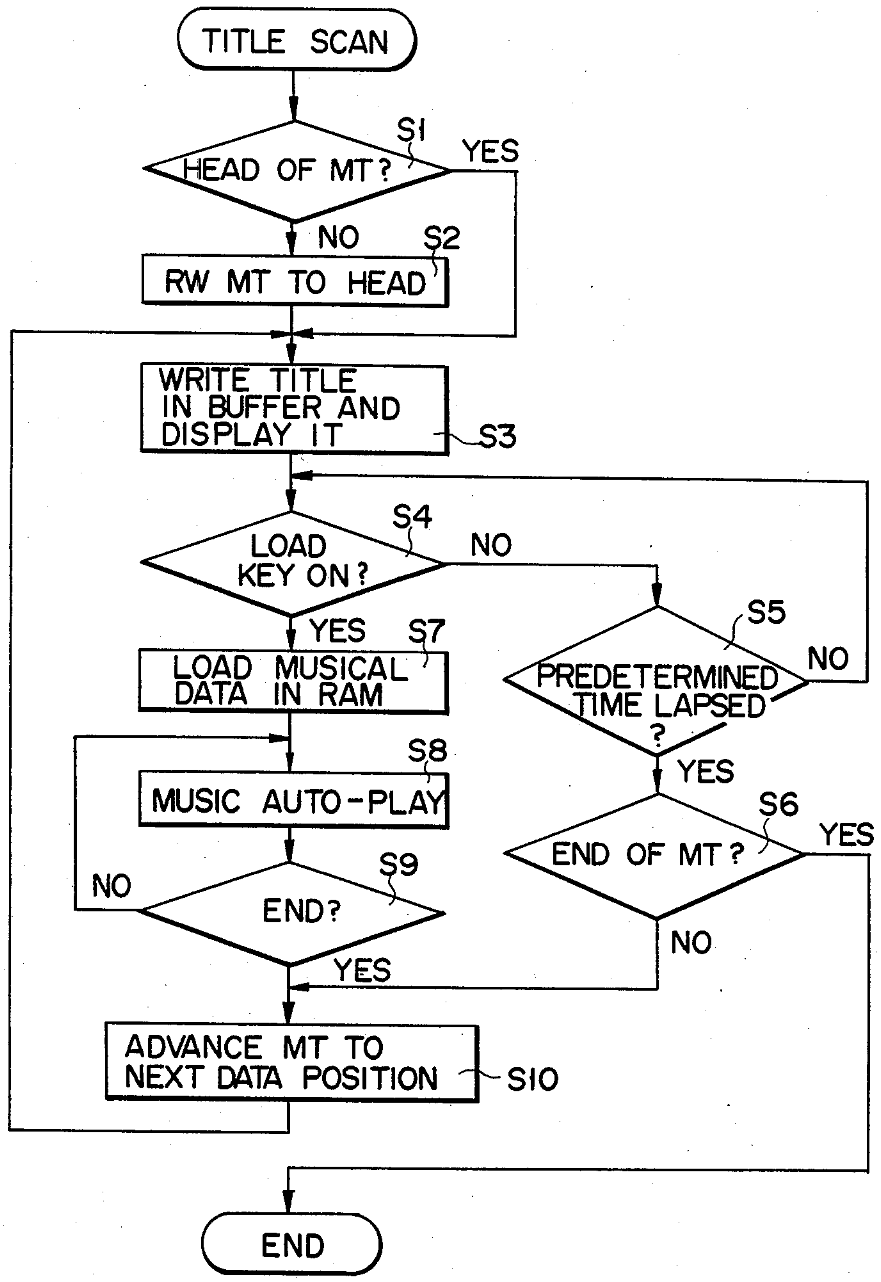
FIG. 19 is a flow chart for explaining the operation of the embodiment of FIG. 17.

Now the operation will be described with reference to the flow chart of FIG. 19. A plurality of music numbers are recorded in advance in the cassette tape recorder 12. The data of these numbers are recorded serially in compliance with the format of FIG. 15. To be more specific, the magnetic tape is first rewound to bring its leading end to the head position in the record mode as noted earlier, and then the title input key 2F-3 in the key input section 30 is operated. At this time, the CPU 11A is providing a read/write signal R/W as a write command to the RAM 11C. Now, title data for the first number is input by operating the key group 30A. The CPU 11A couples the input title data and also produces a title end code. These data are written in a leading memory area of the RAM 11C. Then, the tone data of the first number is input by providing the note and tone length data by operating the keyboard 2A. The tone data input is written in the RAM 11C subsequent to the title end code. When the input of the tone data is completed, the save key 2F-1 is operated. As a result, the CPU 11A provides data for providing a predetermined blank. The data for the first number stored in the RAM 11C is transferred together with the blank data through the CPU 11A and interface to the cassette tape recorder 12 to be recorded in the same. The data for the second number can be similarly recorded. In this way, roughly 100 numbers of music can be recorded in the cassette tape recorder 12.

Now, the operation of reading out only the title data while skipping the other data including the tone data recorded in the cassette tape recorder 12 and successively recording these title data will be described. The magnetic tape with the recorded data is first loaded in the cassette tape recorder 12, and the title scan key 2F-5 is then depressed with the mode switch 2C in the position PLAY. This causes the CPU 11A to execute the program shown in FIG. 19. The CPU 11A first makes a check as to whether the leading end of the data record on the magnetic tape is at the magnetic head position (step S1). If it is not, the CPU 11A rewinds the tape to bring the leading data record end to the magnetic head position (step S2). Then it reads out the title data of the first number and transfers this data to the read buffer 23 (step S2). If it is detected in the step S1 that the leading data record end is at the magnetic head position, the CPU 11A immediately reads out the title data of the first number and transfers the data to the read buffer 23. The title data transferred to the read buffer 23 is converted by the driver 31 into a drive signal for display on the display section 2E. After the display of the title data, the CPU 11A makes a check as to whether the load key 2F-2 is "on" (step S4). If the load key is not "on", the display is continued until a predetermined period of time (5 seconds in this embodiment) is over (step S5). When this predetermined time is passed, the CPU 11A makes a check as to whether the trailing end of the data record on the magnetic tape is at the magnetic head position (step S6). If the trailing end is not at the magnetic head position, it fast feeds the tape with the head in contact therewith until data being read out is discontinued, i.e., until the next blank comes to the magnetic head position (step S10). Then the program returns to the step S3, whereby the title data of the next number is given to the read buffer 23 and displayed. If it is detected in the step S4 that the load key 2F-2 is operated while the prevailing title data is on display, the CPU 11A reads out the pertinent tone data and loads the data into the RAM 11C to start the auto-play of that number (steps S7 and S8). Then it checks whether the auto-play is ended (step S9). When the auto-play is ended, the program goes to the step S10, in which the magnetic tape is fast fed until the next blank is detected. The routine described above is repeatedly executed until it is detected in the step S6 that the trailing end of the data record on the tape comes to the magnetic head position. When this occurs, the CPU 11A detects it and brings an end to the title scan.

It is to be noted that in the above embodiment in response to the operation of the load key during the scanning of the number title data for successive display thereof, the pertinent tone data is transferred to the RAM for automatically playing back that number. Thus, a desired number can be played back as soon as it is found.

Further, since in the above embodiment the title data was keyed in alphabet or katakana letters, they can be readily altered. Furthermore, a library of numbers can be easily prepared.

While in the above embodiment the title data and tone data of each number were recorded as a set, this is by no means limitative. For example, only the title data of a given number of music numbers may be recorded on a leading portion of the magnetic tape so that a desired number may be searched by detecting a count corresponding to the order number of the title data of that number. In this case, it is necessary to observe the title data display only while the initial title data record portion of the tape is being fed to the magnetic head position, so that the desired number can be searched more quickly.

With the electronic musical instrument according to the invention, a hundred or more numbers can be recorded on a magnetic tape. This is convenient for application to a BGM or the like. In this case, however, the numbers recorded on the magnetic tape are played back in the order, in which they are recorded. Therefore, a sort of monotonous sense is given if the whole tape is repeatedly played back. It is thus desirous that the numbers recorded on a magnetic tape be played back randomly so that a sense of freshness can be obtained at all time even if the whole tape is repeatedly played back. This is realized in an embodiment shown in FIGS. 20 through 24B, which will now be described.

Figure 21:
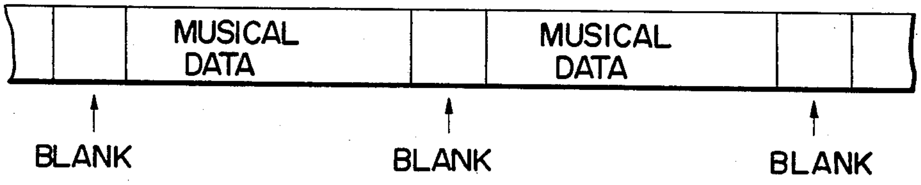
FIG. 21 is a view showing a recording data format.
Figure 20:
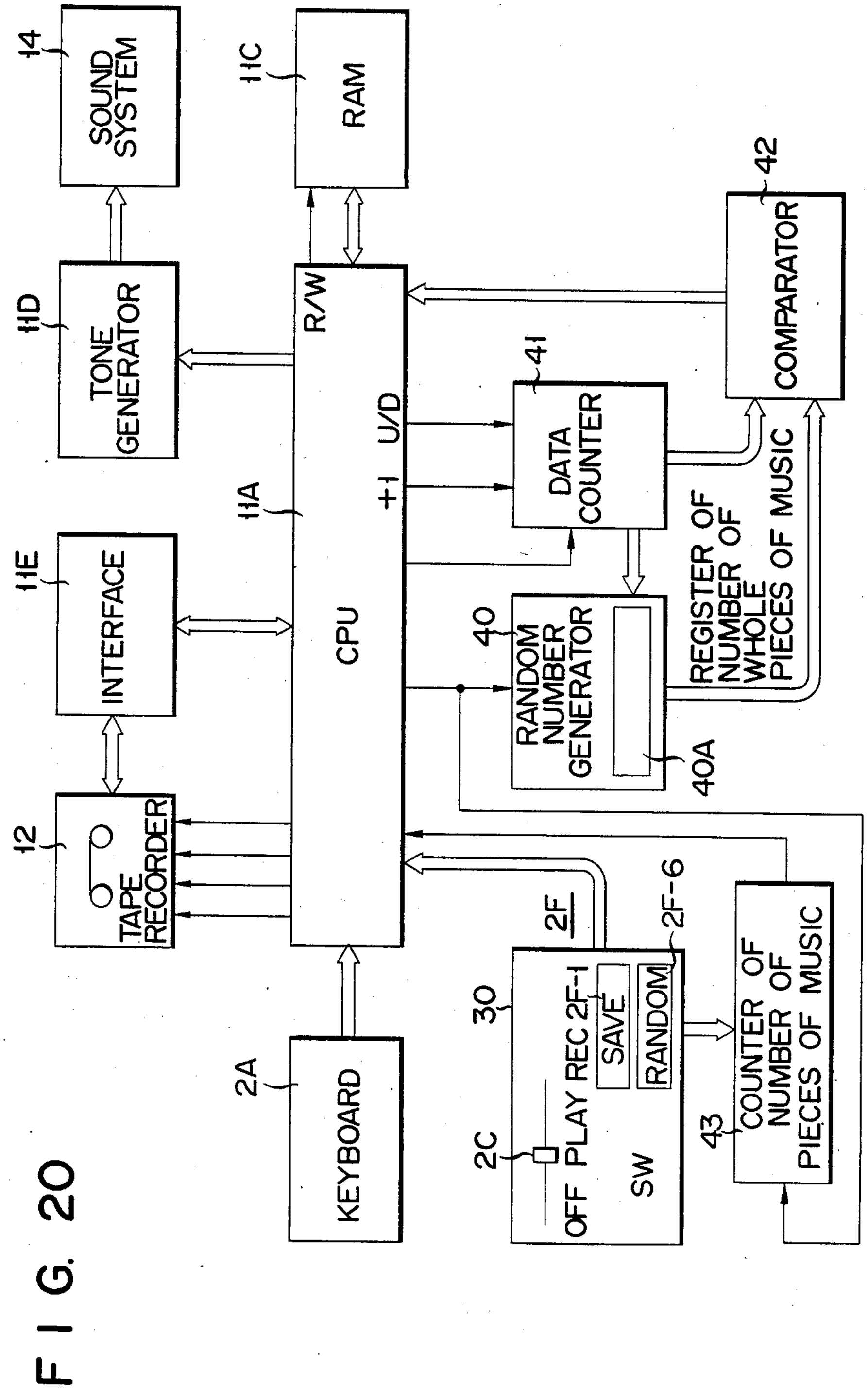
FIG. 20 is a block diagram showing a still further embodiment of the invention.

FIG. 20 shows the circuitry of this embodiment. A tape recorder 12 can effect recording, playback, fast feed and rewinding under the control of corresponding commands provided from CPU 11A. When one of these commands is provided, it is inoperative. It can record a plurality of number tone, for instance as digital data based on the Kansas City Standard System, on a magnetic tape through interface 11E. These number tone data are recorded in a format as shown in FIG. 21, in which a blank portion without any recorded data is provided between adjacent number tone data.

A random key 2F-6 in a control key group 2F is used to cause random reading of tone data from the magnetic tape under the control of a random number generator 40.

The random number generator 40 generates random number data every time it is given a start command from the CPU 11A. The random number data represents a random number which is no greater than the number of data stored in an all music number number register 40A in the random number generator 40. A data counter 41 detects blanks between adjacent tone data recorded on the magnetic tape as shown in FIG. 21, and it indirectly counts tone data intermittently passing by the reproducing head (12D in FIG. 2). The CPU 11A is capable of resetting the counter and also incrementing or decrementing the count. Further, it is capable of providing a count corresponding to the order number of the prevailing music number among the numbers recorded on the magnetic tape, the tone data of which is being reproduced by the reproducing head, and also a count corresponding the number of all music numbers recorded on the tape as will be described later in detail. It supplies all number data to the all music number number register 40A of the random number generator 40 every time the data counter 41 is reset. The random number data from the random number generator 40 and the tone data order number data from the data counter 41 are fed to a comparator 42. The comparator 42 obtains the difference between the input random number and tone data order number. The CPU 11A causes fast feed or rewinding of the magnetic tape with the reproducing head in contact depending upon whether the difference is positive or negative. Also, it supplies an up/down control signal U/D to the data counter 41 to cause up- or down-counting.

A play data number counter 43 serves to set the number of music numbers to be randomly played back. This number may be either greater or less than the number of the music numbers recorded on the tape. When a number is input by operating numerals keys for "0" to "9" which are provided in key section 30, a number greater than the input number by one is automatically set. This is adapted so in order to prevent the count of the play data number counter 43 from becoming zero before the start of playback of the last music number. The play data number counter 43 adds one to the count every time a start command signal noted above is supplied from the CPU 11A to the random number generator 40. When the count becomes equal to the preset number noted above plus one, it provides a carry signal as an end signal to the CPU 11A.

Figure 22:
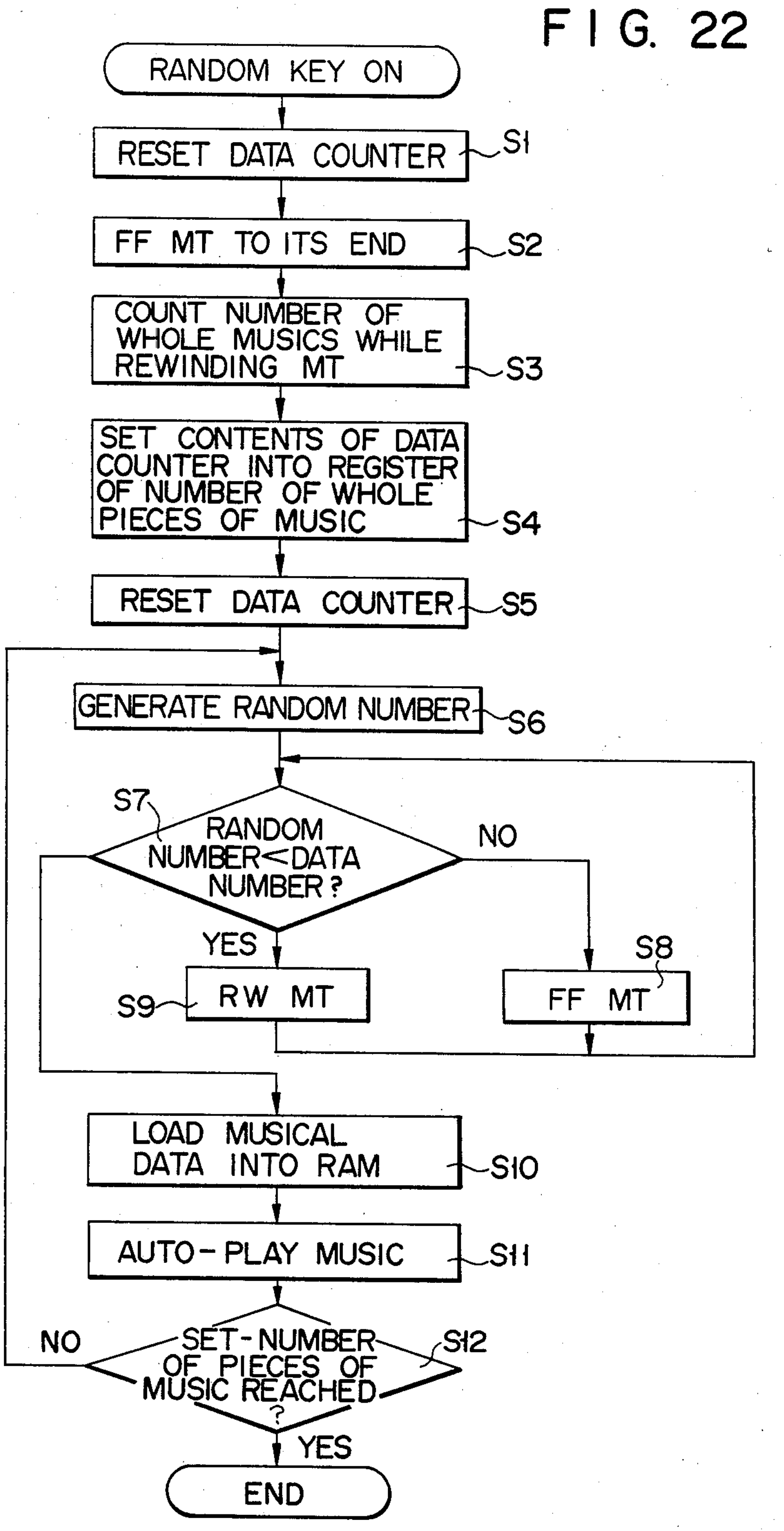
FIG. 22 is a flow chart for explaining the operation of the embodiment of FIG. 20.

The operation will now be described in greater detail with reference to FIG. 22. A plurality of music numbers are recorded in advance in the tape recorder 12. In this case, the tone data for each number is written in the RAM 11C with the mode switch 2C set to the record mode position and by giving the pitch and tone length data of the individual tones by operating the keyboard 2A. Then, the magnetic tape is loaded in the tape recorder 12 and rewound so that its leading end is at the magnetic head position. Subsequently, the save key 2F-1 is operated. At this time, the CPU 11A produces data for providing a predetermined blank. The tone data for one number is recorded together with this blank data on the tape. After the first number data has been recorded in this way, the second number data is similarly recorded. About one hundred music numbers can be recorded on the magnetic tape in this way.

The operation of randomly reproducing the tone data thus recorded on the magnetic tape will now be described. The tape with the data recorded thereon is loaded in the tape recorder 12, and the mode switch 2C is set to the play mode position. Then, the number of music numbers that are desired to be played back at random is set in the play data number counter. Thereafter, the random key 2F-6 is operated. As a result, the CPU 11A supplies a reset signal R to the data counter 41 to reset the same to zero (step S1). Then it fast feeds the magnetic tape until the trailing end thereof is brought to the head position (step S2). If there is some residual data in the data counter 41 at this time, it is transferred to the all music number number register 40A of the random number generator 40. However, it will now be erroneously held as the total number of music numbers because it is immediately renewed to the correct total number number data which is supplied in a step S4.

Subsequently, the magnetic tape having been fast fed, is rewound in contact with the reproducing head to detect blanks between adjacent number tone data. The CPU 11A adds one to the count of the data counter 41 every time a blank passes by the head. In this way, the tape is rewound until its reading end comes to the head position (step S3). The CPU 11A provides an up control signal to the data counter 41 while the tape is rewound. Thus, the data of the data counter 41 never becomes negative. Also, the CPU 11A ignores any data recorded on a tape portion from the last number tone data record position to the last end of tape and inhibits it so that it will not be counted by the data counter 41. The number of all music numbers that are counted in the above way is transferred to the all music number number register 40A and the data counter 41 is reset under the control of the reset signal R supplied from the CPU 11A to the data counter (steps S4 and S5).

The CPU 11A then provides a start command signal to the random number generator 40 and play data number counter 43. The count of the play data number counter 43 is thus decremented by one, while at the same time the random number generator 40 produces a random number (step S6). The random number is fed to the comparator 42. The comparator 42 compares the input random number and the count of the data counter 41 (corresponding to the order number of the prevailing music number)(step S7). If the random number is greater, the CPU 11A fast feeds the tape in contact with the reproducing head and provides an up control signal to the data counter 41 (step S8). If the order number of the prevailing music number is greater, on the other hand, it rewinds the tape in contact with the reproducing head and provides a down control signal to the data counter 41 (step S9). For the playback of the first number, the count of the data counter 41 is zero while the random number is between one and the number of all music numbers. Thus, in this case the random number is greater, so that the magnetic tape is fast fed. While the tape is fast fed or rewound, the reproducing head detects blanks between adjacent number tone data. Every time it detects a blank, it supplies a blank detection signal to the data counter 41. Thus, the data counter 41 always provides a count corresponding to the order number of the number tone data recorded on the tape portion in contact with the reproducing head. The magnetic tape has a leading end portion which is free from magneticity, and the blank for the first number is provided next to this leading end portion. The blank for the first number thus is counted without fail.

When the order number of the prevailing music number becomes equal to the random number as the magnetic tape is fast fed or rewound, the comparator 42 provides a coincidence signal to the CPU 11A, whereupon the CPU 11A switches the fast feed rewind mode over to the play/record mode to load the pertinent tone data through the interface 11E into the RAM 11C (step S10). When the loading is completed, the CPU 11A reads out tone data from the RAM 11C and supplies it to the tone generator 11D for sounding from a sounding system (step S11). If the count of the play data number counter 43 is zero when auto-play is ended or when the loading in the step S10 is ended, the CPU 11A receives the carry signal noted above as an end signal. According to this carry signal, the CPU 11A checks whether the preset number of music numbers is reached by the number of music numbers that have been played (step S12). If the carry signal has not yet been produced, the operation from the generation of a random number till the auto-play of the pertinent music number is repeatedly executed (steps S6 through S11). When the preset number is reached, the random auto-play is ended. In the above operation, the count of the play data number counter 43 reaches one less than the preset number (which is equal to the keyed-in number plus one) set in the play data number counter 43 at the instant when the start command signal for the auto-play of the last number is received, and it becomes equal to the preset number when the next start command signal appears. The CPU 11A neglects a signal provided from the comparator 42 with the generation of a random number, but it ends the entire operation by giving priority to the end signal received. For this reason, a number greater than the keyed-in number is set in the play data number counter 43. Further, when the tone data for one music number is read out, the magnetic tape is stopped as soon as its portion immediately preceding the blank preceding the next number tone data comes to the head position, so that this preceded blank is not counted. This is done so because otherwise, i.e., if the tape is stopped when its portion corresponding to a blank comes to the head position, the blank would be counted twice, i.e., immediately before the stop and immediately after the start of the tape.

With the above embodiment, the number of times successive random auto-play of music numbers can be freely set. Also, since the random number generated is never greater than the number of all music numbers stored in the all music number number register 40A, there is no possibility that no tone data is selected for a given random number.

Figure 23:
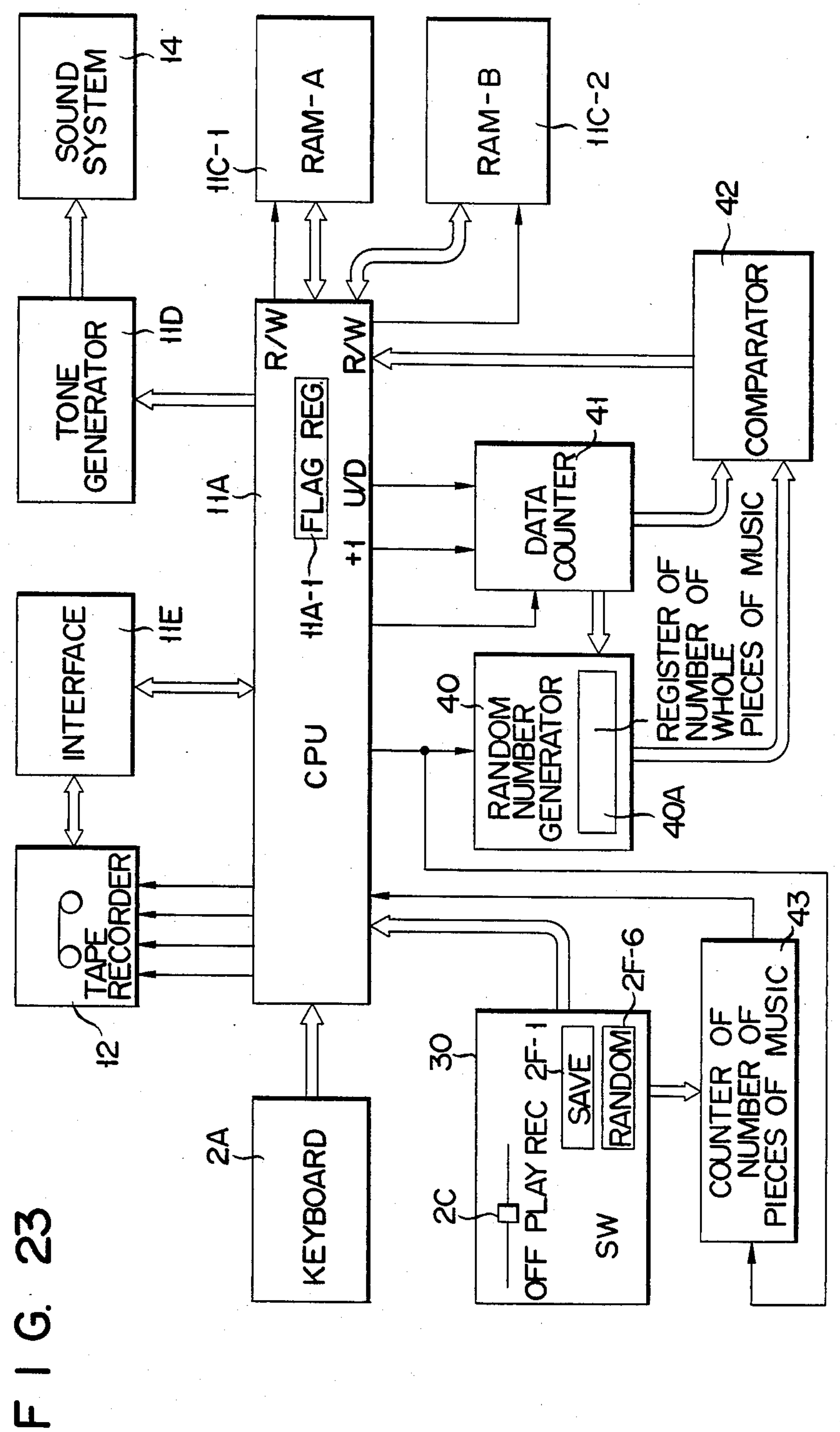
FIG. 23 is a block diagram showing a further embodiment of the invention.

FIG. 23 shows a modification of the embodiment of FIG. 20. In this instance, two RAMs, i.e., a RAM-A 11C-1 and a RAM-B 11C-2 are connected to CPU 11A. The CPU 11A includes a flag register 11A-1. Data read out from magnetic tape is written in whether RAM-A 11C-1 or RAM-B 11C-2 depending upon whether the data in the flag register 11A-1 is "1" or "0". For the rest of the construction, the instant modification is the same as the previous embodiment of FIG. 20.

Figure 24A:
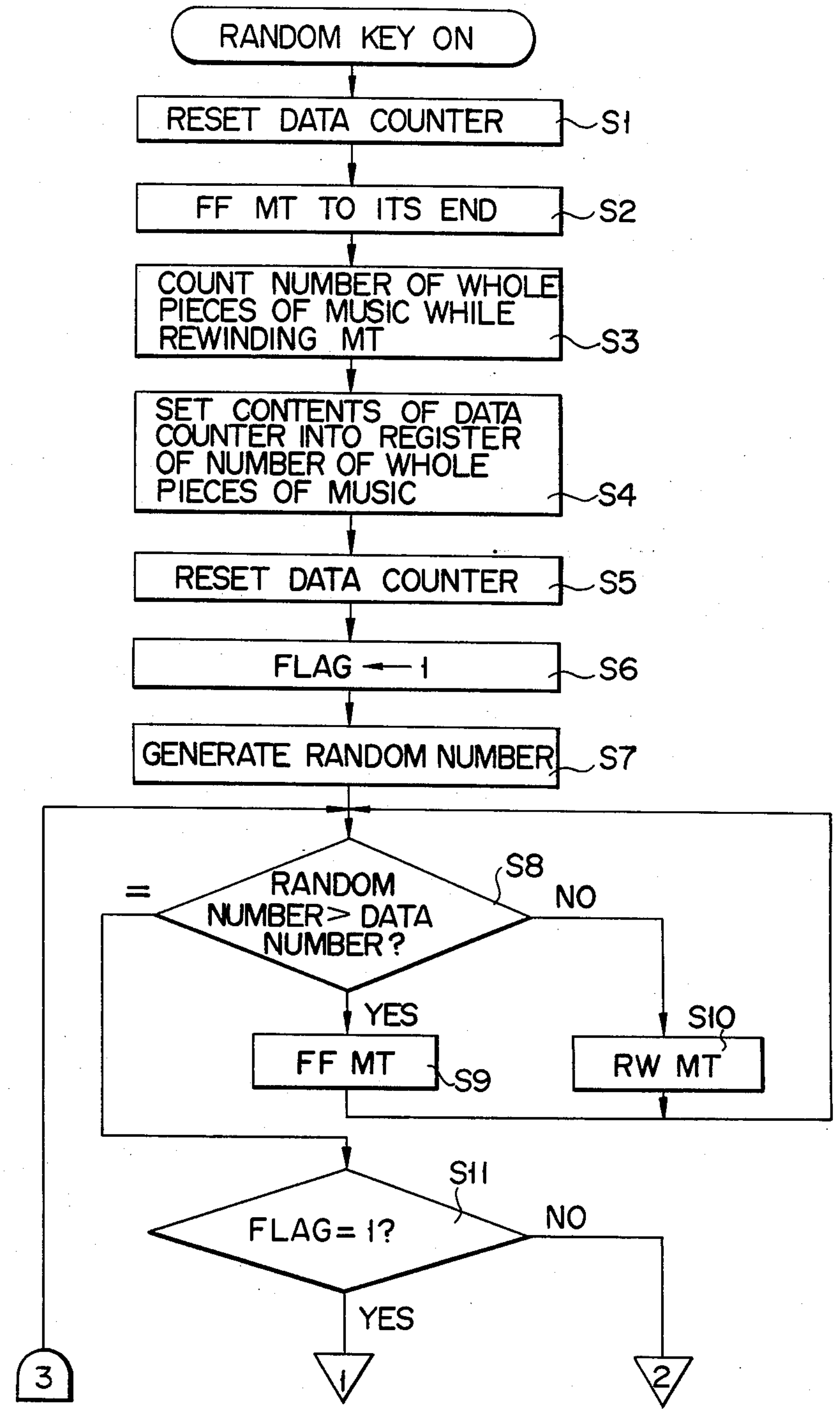
FIGS. 24A and 24B are flow charts for explaining the operation of the embodiment of FIG. 20.
Figure 24B:
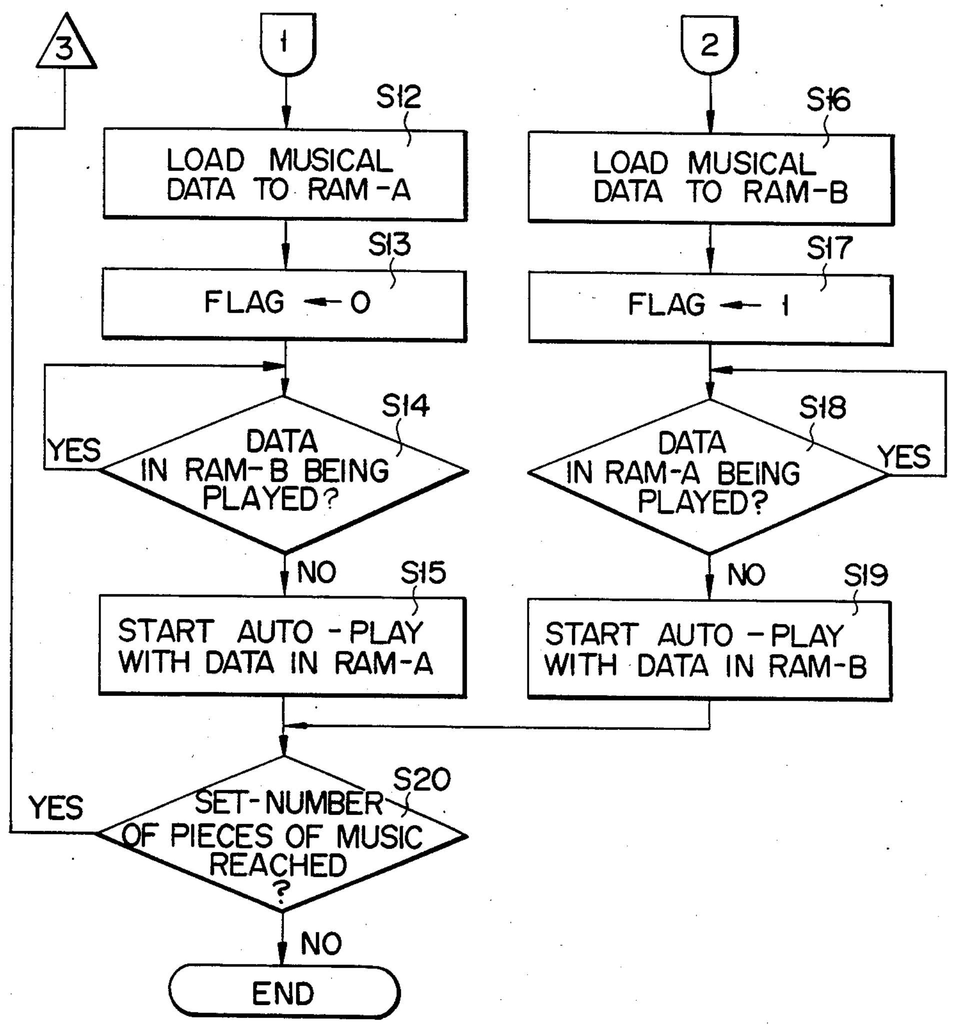

The operation of this construction will now be described with reference to the flow charts of FIGS. 24A and 24B. The recording of tone data on the magnetic tape is done in the same manner as with the embodiment of FIG. 20.

Random auto-play of music numbers recorded on the magnetic tape can be obtained in the same way as with the embodiment of FIG. 20. More specifically, the play data number is set in the play data number counter 43, the data counter 41 is reset, the number of all music numbers recorded on the tape is set in the all music number number register 40A, and the data counter 41 is reset again (steps S1 through S5). In a subsequent step S6, data "1" is set in the flag register 11A-1. Subsequent steps S7 to S10, in which a random number is generated and pertinent data recorded on the magnetic tape is selected, are the same as in the embodiment of FIG. 20.

Subsequently, whether the data in the flag register 11A-1 is "1" or "0" is checked (step S11). If it is "1", the tone data read out from the tape is loaded into the RAM-A 11C-1. Then the flag register 11A-1 is set to "0", and a check is done as to whether the tone data stored in the RAM-B 11C-2 is being read out and played. If it is not being played, the tone data loaded into the RAM-A 11C-1 is read out and played. The operation so far is executed in steps S12 through S15. Since "1" is set in the flag register 11A-1 in the step S6 for the play of the first number, the tone data thereof is written in the RAM-A 11C-1. Since at this time no tone data is loaded in the RAM-B 11C-2, the step S14 is immediately passed, so that the first number tone data is read out from the RAM-A 11C-1 and played.

If it is detected in the step S11 noted above that the data in the flag register 11A-1 is "0", the tone data is loaded into the RAM-B 11C-2, and then an operation similar to the steps S12 through S15 is executed with respect to the RAM-A 11C-1 (steps S16 to S19). Then, whether the preset play data number is reached is checked (step S20). If it is not, tone data are loaded alternately into the RAM-A 11C-1 and RAM-B 11C-2 and played. Thus, continuous random auto-play can be obtained, and it is ended when the preset play data number is reached. The tone data can be loaded alternately into the RAM-A 11C-1 and RAM-B 11C-2 because the data of the flag register 11A-1 is switched in the step S14 or S18 after checking of the step S11 as to whether the data of the flag register 11A-1 is "1" or "0" is done. Thus, a plurality of music numbers can be continuously played at random.

With the above embodiment, after the play of the tone data loaded in the RAM-A is started, the search for the next number tone data and the loading thereof into the other RAM-B are done so that the next number can be played immediately after the end of the play of the number from the RAM-A. Thus, randomly selected music numbers can be played continuously without any wait time between adjacent numbers.

The embodiments described so far are by no means limitative, and the following changes and modifications are possible.

(1) While the above embodiments employed cassette magnetic tapes as recording means, it is also possible to use those of open reel type or for the video tape recorder or magnetic discs or magnetic drums. Further, it is possible to use such recording means as record discs, optical discs, RAMs, ROMs, paper tapes and bar codes for the random auto-play.

(2) Further, the blanks provided between adjacent tone data on the magnetic tape, used in the above embodiments to obtain the count corresponding to the order number of tone data read out from the recording means, may be replaced with address data, which represent the order numbers of the recorded number tone data and are also recorded on the recording means. In this case, the data read out is coupled directly from the CPU 11A to the data counter 41. Thus, the number of all music numbers can be known immediately when the address data for the last number tone data is read out.

(3) Data may be recorded in the recording means as ordinary analog data as well as digital data.

(4) In the embodiment of FIG. 20 a random number was generated for search of the partinent number after the auto-play of the preceding number had been ended. It is also possible to let the generation of a random number and search of the pertinent number be completed while the tone data loaded in the RAM 11C is being played. This can be realized by inserting the steps S14 through S18 in FIG. 24B between the steps S7 and S10 in FIG. 22. By so doing, the wait time between adjacent numbers randomly played back can be reduced.

(5) While the musical data for random auto-play was dealt with in the foregoing, the invention is also applicable to any other data such as study problem data and movie data.

In any of the above instances, a plurality of data can be reproduced at random through the comparison of a random number generated from random number generating means and a record order number from means for determining the order of recording of the individual data in the recording means and selection of the data of the record order corresponding to the random number according to the result of the comparison. Thus, a sense of freshness can be maintained while the same record is repeatedly played back.

While the method of selecting a desired one of a plurality of music numbers recorded on a magnetic tape has been described above, in order to be renew tone data loaded in the RAM with other tone data, the record position of that tone data on the magnetic tape must be accurately identified. Otherwise, it is liable to delete different tone data by mistake. Thus there is a need for the being able to readily confirm the record position of data on the magnetic tape in such cases as when playing back, searching and renewing tone data. This is realized in an embodiment shown in FIGS. 25 through 35, which will now be described.

Figure 25A:
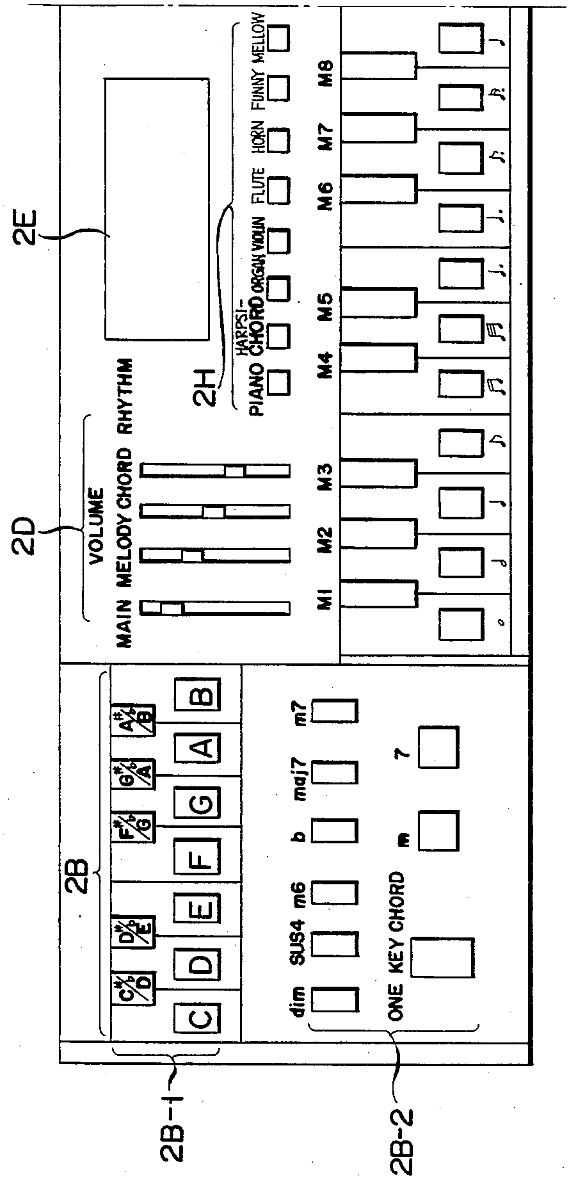
FIGS. 25A and 25B are top views showing an operation panel of a further embodiment of the invention.
Figure 25B:
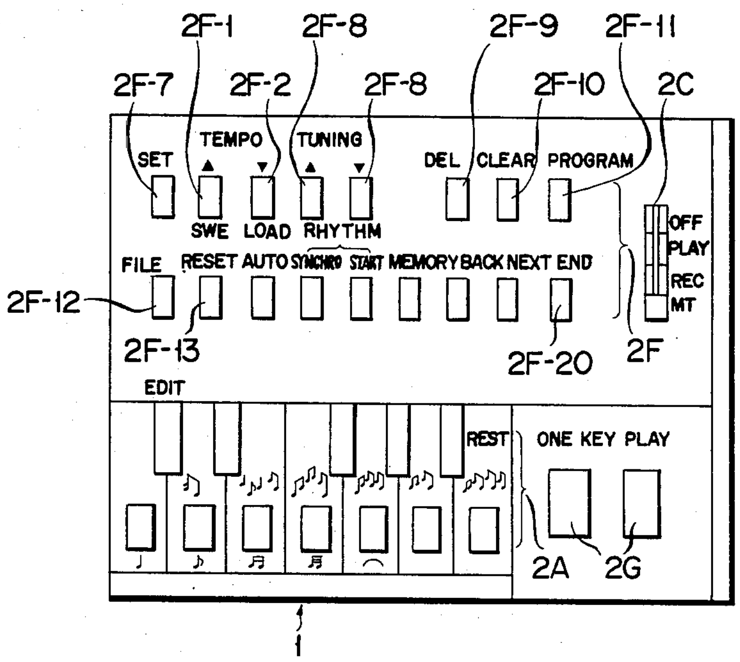

Referring to FIG. 25, a casing 1 of electronic musical instrument has a 31-key keyboard 2A provided on its top front portion and a chord designation key group 2B provided on the left side of the keyboard. Further, it has a control key group 2F and including a key for recording digital data on a magnetic tape, a tone color designation key group 2H for selecting tone colors, a volume switch group 2D, a mode selection switch 2C and a display section 2E, these being provided on the rear side of the keyboard 2A. It further has a one-key play key group 2G provided on the right side of the keyboard 2A.

The keyboard 2A has 31 keys for notes from "fa" in the first octave to "ti" in the third octave. Its keys corresponding to white keys can also be used to give tone length to the tone and chord data written in the RAM 11C, designate rhythms such as waltz and also designate arpeggio patterns. Its keys corresponding to black keys can also be used to select eight memory areas M1 to M8 of the RAM 11C and also specify memory editing.

The chord designation key group 2B includes a root designation key group 2B-1 and a chord kind designation key group 2B-2 like the previous embodiment of FIG. 1. The control key group 2F consists of a set key 2F-7, tempo keys 2F-1 and 2F-2, tuning keys 2F-8, a delete key 2F-9, a clear key 2F-10, a program key 2F-11, a file key 2F-12, a reset key 2F-13, an auto-play key 2F-14, a synchro/start key 2F-15, a start key 2F-16, a memory key 2F-17, a back key 2F-18, a next key 2F-19 and an end key 2F-20. The tempo keys 2F-1 and 2F-2 can also be used as a save key and a load key respectively in a tape recorder mode to be described later.

The tone color designation key group 2H consists of eight keys for selecting respective tone colors of piano, harpsichord, organ, violin, flute, horn, fantasy and mellow. These keys also can be used to designate respective magnetic tape recording blocks 1 and 2 of the magnetic tape recording area. These blocks are each divided into 31 data areas individually corresponding to the respective 31 keys of the keyboard 2A. Thus, a desired data area can be designated by a combination of a key in the tone color designation key group 2H and a key on the keyboard 2A. A total of $8\times31=248$ different data areas can be designated.

Figure 26:
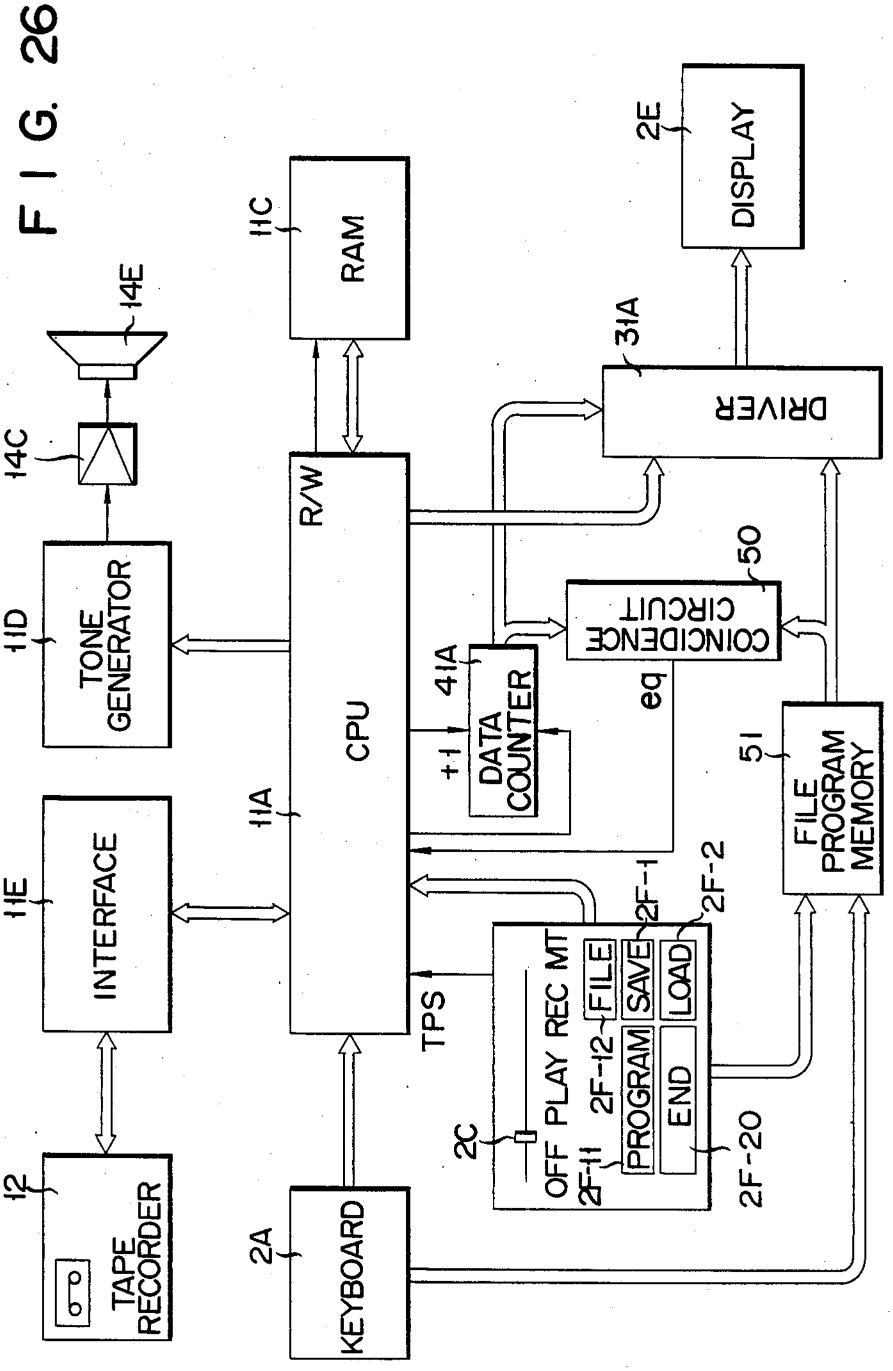
FIG. 26 is a block diagram showing the circuitry of the embodiment of FIG. 25.

FIG. 26 shows the circuitry of this embodiment. It comprises a CPU 11A, to which each key output of the keyboard 2A, each key output of the chord designation key group 2B, each key output of the control key group 2F, each key output of the tone color designation key group 2H, each control output of the volume control group 2D, output of the mode selection switch 2C and each output of the one-key play key group 2G can be transferred. The CPU 11A controls all the operations of the electronic musical instrument, and it consists of a one-chip LSI (large-scale integrated circuit) microprocessor. When the keyboard 2A is operated in the play mode, the CPU 11A supplies tone generation data to a tone generator 11D. The tone generator 11D then generates tone signals which are coupled through an amplifier 14C to a loudspeaker 14E for sounding. When the keyboard 2A and chord designation key group 2B are operated in the record mode, the CPU 11A supplies tone data of the music to the RAM 11C for storage therein.

Figures 27, 28:
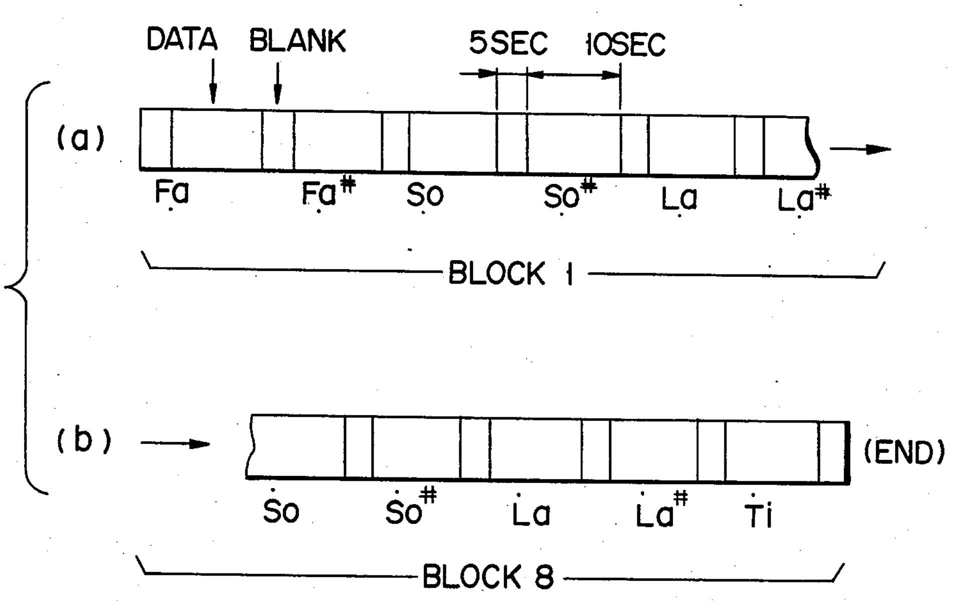
FIG. 27 is a view showing the relation between tone color designation keys and data area blocks.
FIG. 28 is a view showing a recording data format of a magnetic tape.

The magnetic tape in the tape recorder 12, as mentioned earlier, has 8 blocks which can be designated by the respective keys in the tone color designation key group 2H and each of which consists of 31 data areas which in turn can be designated by the respective keys in the keyboard 2A, that is, it has a total of 248 data areas. FIG. 28 shows the data area pattern of the magnetic tape. Labeled Fa, Fa#, So, . . . with an under-dot are respective notes "fa", "fa#", "so", . . . in the first octave. Labeled So, So#, La, . . . with an over-dot are respective notes "so", "so#", "la", . . . in the third octave. The individual data areas have a capacity equal to the capacity of the RAM 11C. Tone data of one music number transferred from the RAM 11C can be saved into each data area as digital data complying with the Kansas City Standard System through conversion in an interface 11E. As shown in FIG. 28, the tone data of a number is recorded in each data area together with a blank, which is provided by the interface 11E for distinguishing the tone data from other tone data. The tone data for each number and a blank are recorded as a set. The tone data section and blank section of each data area cover respective times of 10 and 5 seconds of tape running.

The tone data saved in the magnetic tape are transferred for one number after another for loading to the RAM 11C to be transferred to the tone generator 11D for the auto-play.

A data counter 41A can indicate the prevailing data area of the magnetic tape, i.e., the portion thereof running past the head position. It is reset by a reset signal R provided from the CPU 11A. Its up-counting is caused by a "+1" signal provided from the CPU 11A. Its count output is supplied to one input of a coincidence circuit 50, and is also supplied to a driver 31A for displaying on the display section 2E.

When saving tone data of a music number from the RAM 11C into a designated data area of the magnetic tape, data representing the position of that data area is written in a file program memory 51 by operating the file key 2F-12, keys of the tone color designation key group 2H, keys of the keyboard 2A and save key 2F-1. When designating a plurality of music numbers recorded on the magnetic tape for continuously auto-playing these numbers, data representing the positions of the data areas in which these numbers are recorded, are written in the memory by operating the file key 2F-12, program key 2F-11, keys of the tone color designation key group 2H, keys of the keyboard 2A and end key 2F-20. The data written in the file program memory 51 is fed to the other input of the coincidence circuit 50 and also to the driver 31A. The coincidence circuit 50 executes a check as to whether the two inputs coincide. When the two coincide, it provides a coincidence signal eq to the CPU 11A, which then causes a predetermined processing. A signal TPS is supplied to the CPU 11A when the file key 2F-12 is operated.

The driver 31A drives the display section 2E which consists of a liquid crystal display unit. More specifically, it drives the display section 2E by dynamic driving by supplying a common signal and segment signals to an electrode to be energized according to display data.

Figure 29A:
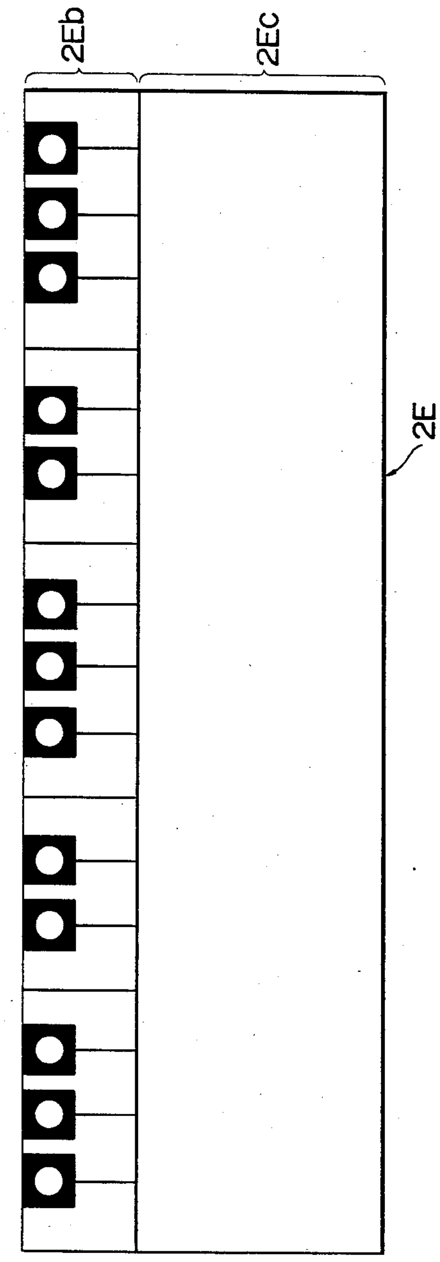
FIGS. 29A and 29B are views showing the construction of a display section.
Figure 29B:
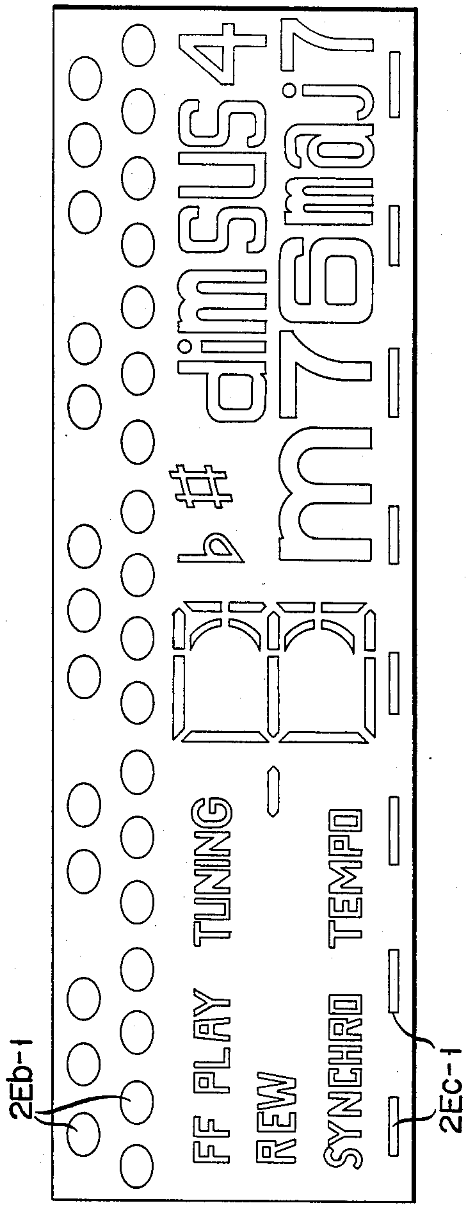

FIG. 29A shows a liquid crystal display panel 2Ea of the display section 2E. It includes a note display section 2Eb having an appearance like a keyboard and a character display section 2Ec which is provided under the note display section 2Eb and can display chord and other tone data. FIG. 29B shows the display segment arrangement of the liquid crystal display panel 2Ea, which can display melody notes, chords, chord positions, rhythms, etc. The position of a data area of the magnetic tape can be displayed by a combination of one of 31 circular display elements 2Eb-1 provided in the note display section 2Eb and one of 8 bar-like display elements 2Ec-1 provided in the character display section 2Ec. Character display elements representing characters "FF" and "REW" can display the forward feed and rewind states of the tape respectively.

The operation of the embodiment of the above construction will now be described with reference to FIGS. 30 to 35. First, the operation will be described in connection with a case of saving tone data of a music number into the magnetic tape after writing tone data in the RAM 11C. To write the tone data in the RAM 11C, the mode selection switch 2C is set to the record mode. As a result, a read/write control signal R/W is supplied as a write command to the RAM 11C. Then, the note data of the individual notes of the melody of the music are successively input by operating the keyboard 2A. After the input of the series of note data has been completed, tone length data are added to the individual note data in the series by operating only the write keys as shown in FIG. 25. When the melody data of the number has been written in the RAM 11C, the tone length data for chords are input by operating the chord designation key group 2B.

Figure 30:
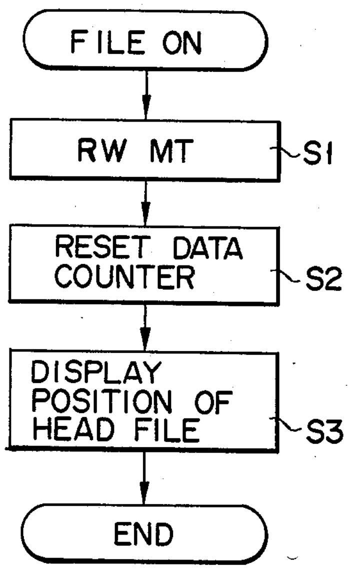
FIGS. 30 to 33 are flow charts for explaining various programs of control of the circuit of FIG. 26.
Figure 31:
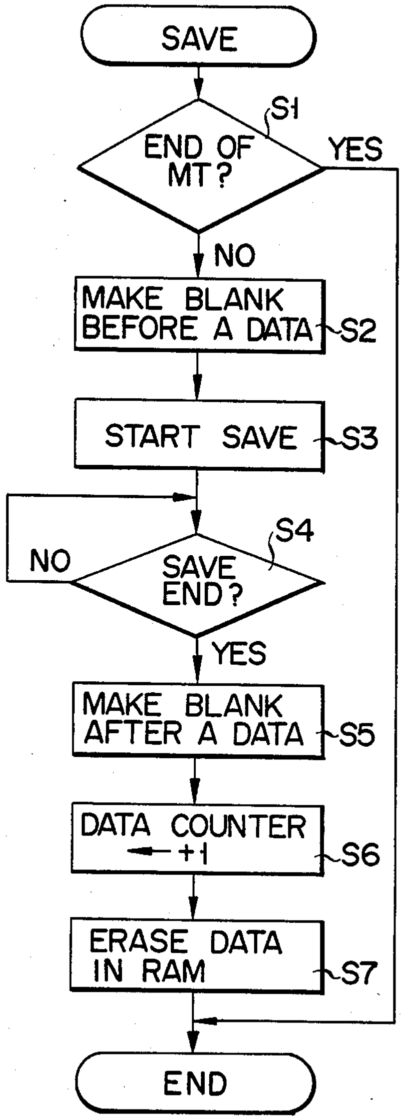

After the tone data for one music number has been written in the RAM 11C in the above manner, the mode selection switch 2C is switched over to a tape recorder mode position MT. As a result, a read/write control signal R/W is supplied as a read command to the RAM 11C. Then, the positioning of the tape is done by operating the file key 2F-12. With the operation of the file key 2F-12 the signal TPS is produced to be supplied to the CPU 11A. The CPU 11A thus starts a control program as shown in FIG. 30. In a first step S1, the magnetic tape is rewound by its drive motor. In a subsequent step S2, the CPU 11A supplies a reset signal R to the data counter 41A to reset the same. The data counter 41A thus commences to provide its count output to the driver 31A. Thus, the first data area of the block No. 1 of the magnetic tape (in which the tone data of the first music number is to be recorded) is displayed as the first file area on the display section 2E as shown in (a) in FIG. 35 (step S3). As is shown, a left end bar-like display element 2Ec-1 which represents the block No. 1 is turned on in the character display section 2Ec. At the same time, a circular display element 2Eb-1 corresponding to the key for "fa" in the first octave is turned on in the note display section 2Eb.

In the above operation the positioning of the magnetic head is ended. Now, the save key 2F-1 is operated to save the tone data from the RAM 11C into the aforementioned data area for the first number. As a result, the CPU 11A starts a program shown in FIG. 31. First, it makes a check as to whether there is residual data in the tape (step S1). Since in the instant case there is residual data, a subsequent step S2 is executed. In this step S2, the interface 11E produces blank data in compliance with the Kansas City Standard System while the tape is running for 5 seconds from its position with the leading end at the head position. The blank end is recorded in the first number data area from the leading end thereof. Subsequent to this, the tone data is transferred from the RAM 11C and saved subsequent to the blank. During the saving of the tone data, a check as to whether the saving is over is done (steps S3 through S4). The saving is completed in about 10 seconds. Then, a step S5 is executed, in which the tape is run further for about 2.5 seconds to produce a next blank subsequent to the tone data. When this is completed, the tape is stopped. The CPU 11A then provides a "+1" signal to the data counter 41A, changing the count thereof to "1" to designate the second data area (step S6). The RAM 11C is then cleared to erase the first number tone data (step S7).

The tone data of the second music number may be recorded in the second data area in the manner as described above. When saving the tone data of the second and following numbers, the magnetic tape is run for about 2.5 seconds in the step S2 in FIG. 31, that is, the blank is produced by running the tape for a total of 5 seconds inclusive of the time in the step S5. When 248 music numbers are saved in the respective 1st to 248th data areas so that there is no remaining data area for saving, this is detected in a step S1 in FIG. 31, and the subsequent saving of tone data is inhibited. In (b) in FIG. 35, it is shown that the position of the data area for the 100th music number is displayed.

Figure 32:
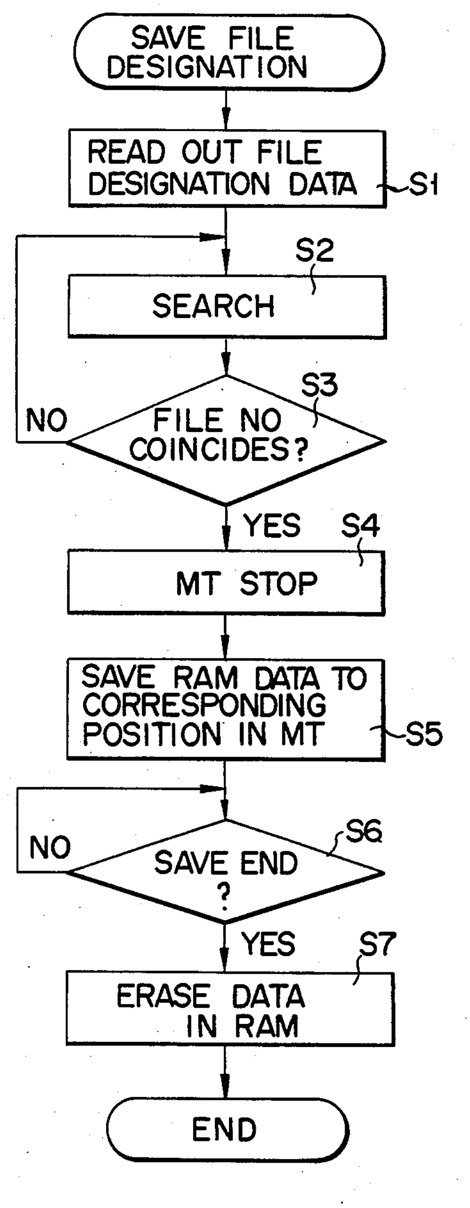

Now, the operation in case of replacing the tone data in a designated data area of the tape with different tone data will be described with reference to the flow chart of FIG. 32. The substitute tone data is written in advance in the RAM 11C in the manner as described before. If the tone data of the 80th number in the 80th data area, for instance, is to be replaced, the file key 2E-12, the key labeled ORGAN in the tone color designation key group 2H, which designates the block No. 3, the key for the note "la#" in the second octave in the keyboard 2A, which designates the 18th data area, and the save key 2F-1 are operated in the mentioned order. With the operation of the file key 2F-12 the program of FIG. 30 is executed to the magnetic tape, while resetting the data counter 41A and displaying the first data area on the display section 2E. Further, numerical data "79" which represents the 80th data area is preset in the file program memory 51. This data "79" is fed to the coincidence circuit 50 and also to the driver 31A. At this instant, the display section 2E displays the position of the first data area and also displays the position of the 80th data area by flicker display as shown in (c) in FIG. 35. The program shown in the flow chart of FIG. 32 is started from the instant of operation of the save key 2F-1.

In a step S1, the 80th data area is searched. To be more specific, the data counter 41A is caused to up-count and the count thereof and the numerical data "79" noted above are compared after the data "79" has been read into the file program memory 51 in the step S1 and until a coincidence signal eq of "1" is produced from the coincidence circuit 50 through the steps S2 and S3. At this time, the magnetic tape is run for greater data area order numbers every time the count of the data counter 41A is incremented by one. The changing count of the data counter 41A is progressively displayed on the display section 2E. In (d) in FIG. 35, that the 79th data area is being searched. When the count of the data counter 41A becomes "79" representing the position of the 80-th data area, that is, when the two input data to the coincidence circuit 50 coincide, the coincidence circuit 50 produces a coincidence signal eq of "1" supplied to the CPU 11A. The magnetic tape is thus stopped when its portion immediately preceding the 80th data area comes to the head position (step S4). At this time, this position is displayed on the display section 2E, as shown in (e) in FIG. 35. Then, the tone data is saved from the RAM 11C into the magnetic tape (step S5). During this time, a check is also done as to whether the saving is over (step S6). When the saving is over, the tone data in the RAM 11C is cleared in a step S7.

Figure 33:
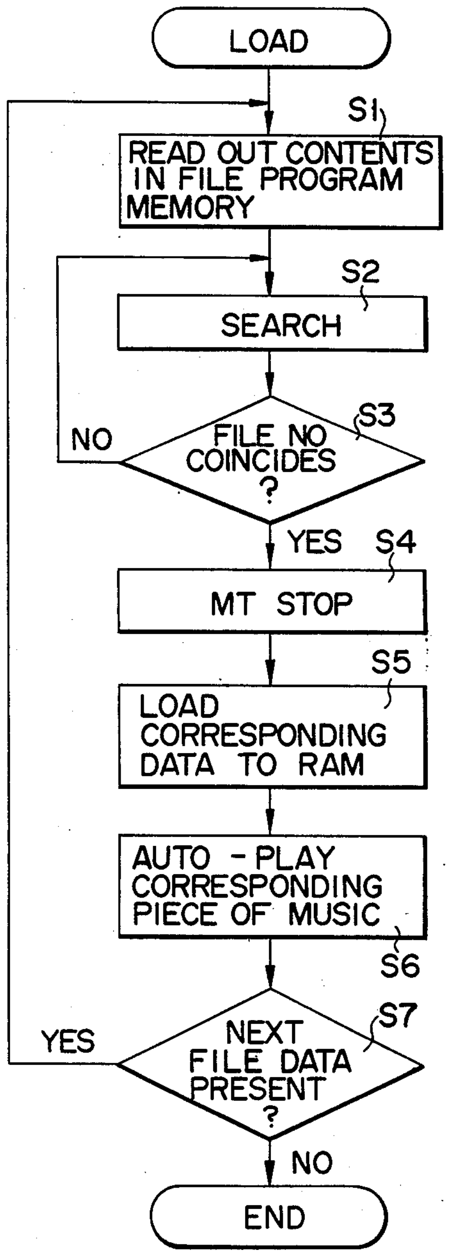

Now, the operation for causing continuous auto-play of a plurality of music numbers by selecting these numbers from among the numbers recorded in the magnetic tape and writing the data area numbers of these numbers in the program file memory 51 in advance, will be described with reference to the flow chart of FIG. 33 and also to FIG. 34.

Figure 34:
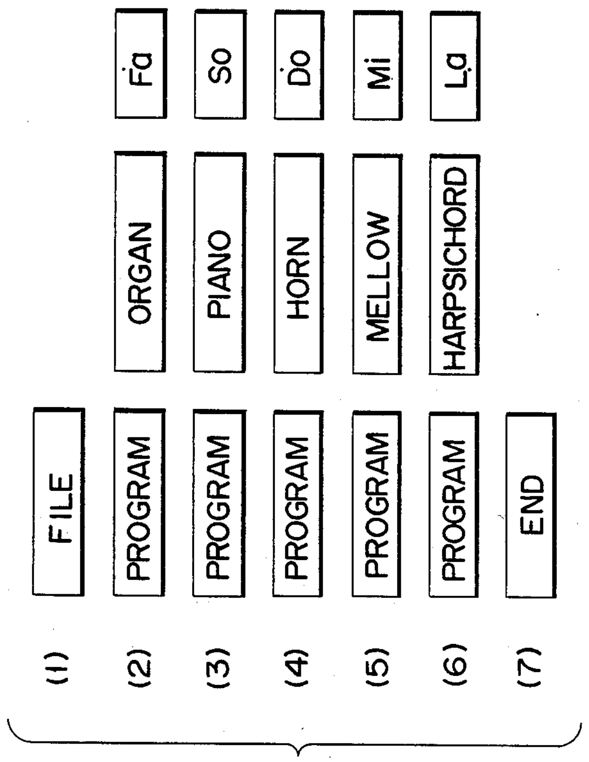
FIG. 34 is a view showing an example of title designation.
Figure 35:
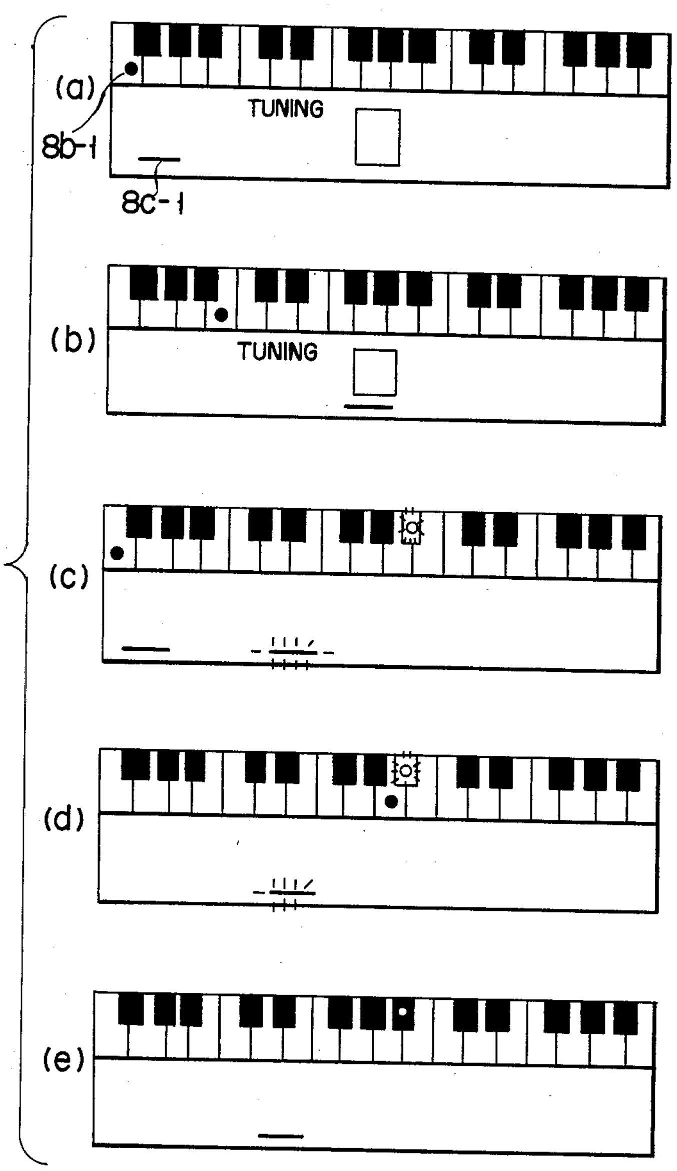
FIG. 35 shows various states of display on a display section.

In this case, the file key 2F-12 is first operated to position the tape and reset the data counter 41A, as shown in (1) in FIG. 34. Then a selected number is designated. Assuming that the 87th number is selected, for instance, it is set by operating first the program key 2F-11, then the key ORGAN in the tone color designation key group 2H and then the key for "fa" in the third octave in the keyboard 2A, as shown in (2) in FIG. 34. Shown in (3) to (6) in FIG. 34 are subsequent operations of designating the 15th, 175th, 219th and 60th numbers. The key for "so" shown in (3) in FIG. 34 is "so" in the second octave. To cause auto-play of these five designated numbers, the end key 2F-20 is operated, and the load key 2F-2 is operated, whereby the program shown in FIG. 33 is started.

In a step S1, numerical data "86" representing the 87th number which is to be auto-played first is read out from the file program memory 51 and registered in the coincidence circuit 50. Then, the data counter 41A is incremented by "+1", and the pertinent data area is searched by running the magnetic tape by one data area after another (steps S2 and S3). When the 87th data area is detected, the step is stopped (step S4). The tone data of the 87th number is then read out from the 87th data area and loaded into the RAM 11C (step S5). The loaded tone data is transferred to the tone generator 11D and auto-played (step S6). When the auto-play of this number is ended, a step S7 is executed, in which a check is done as to whether there is the next file data, i.e., whether the program file memory 51 contains data to specify the next number. If there is data, the program returns to the step S1, whereby the next number, i.e., the 15th number recorded on the magnetic tape in the above example, is auto-played. At this time, the steps S1 through S7 are repeated. These steps are further repeated for the 3rd, 4th and 5th numbers.

While in the above embodiment the magnetic tape is divided into 248 data areas in which to record respective numbers, this is by no means limitative, and it is possible to set any desired number of data areas. Further, the liquid crystal display unit used for the display section may be replaced with any other suitable display unit. Yet further, the way of displaying the magnetic tape data area position in the above embodiment may be replaced with any other suitable way, for instance a display in numerical value using figure eight display elements. Further, the capacity of the data area, and hence the capacity of the data section and blank section of the area, can be suitably set. Further, the Kansas City Standard System is not limitative, and it is possible to adopt any other suitable digital recording system such as the Sapporo City Standard System. Further, the magnetic tape as the recording means may be replaced with various other magnetic recording means.

As has been shown, in the above embodiment the record position of tone data being transferred from digital storage means to magnetic recording means or vice versa can be displayed. Thus, even where tone data of a large number of music numbers are digitally recorded on a magnetic tape, the location of data on the tape can be very readily identified when playing back, searching or renewing the data, and these operations can very readily done.

A magnetic tape has been used in the above-mentioned six embodiments. Further, another magnetic recording medium such as a magnetic card, a magnetic disk, a magnetic drum, magnetic/optical disk and the like may be used.

What is claimed is:

1. An electronic apparatus comprising:

a magnetic tape in which is sequentially recorded a plurality of music number data records comprised of tone data in digital form, a blank space being interposed between adjacent music number data records;

random number generator means for generating a random number;

detector means for detecting the sequence of music number data records recorded on said magnetic tape by detecting the blank spaces;

selecting means responsive to said detector means and to said random number generator means for selecting, from said magnetic tape by fast feeding said magnetic tape in one of forward and reverse directions until said detector means detects the music number data record corresponding to said random number, from said magnetic tape the music number data record having a number in the sequence of music number data records which is the same as the random number generated by said random number generator means;

reproducing means for reproducing the music number data record selected by said selecting means;

memory means for storing digital tone data of music number data record reproduced by said reproducing means;

control means for controlling the reading and writing of the digital tone data to and from said memory means;

a tone generator for generating a tone signal as a function of the digital tone data which is read out from said memory means; and a sound system coupled to said tone generator for amplifying the tone signal to an audible sound.

2. The electronic apparatus according to claim 1, wherein said memory means comprises at least two memories, and said control means includes means for writing the next music number data record selected by said selecting means into one of said two memories while tone data is read out from another one of said memories into said tone generator.

3. The electronic apparatus according to claim 1, wherein said detector means comprises a counter which increases or decreases its count whenever a blank space of said magnetic tape is detected, and a further control means for controlling the counter so as to decrease the count thereof during rewinding of said magnetic tape and so as to increase the count thereof during fast forward feed of said magnetic tape.

4. The electronic apparatus according to claim 1, wherein said detector means includes means for detecting the sequence of the whole music number data record recorded on said magnetic tape to check the number of the whole music number data recorded on said magnetic tape, and thereafter said random number generator means generates a random number within the number of the whole music number data.

5. The electronic apparatus according to claim 1, wherein said random number generator means generates a random number for a prescribed number of times every time the reproduction of a music number data record is completed at the reproducing means.

* * * * *

UNITED STATES PATENT AND TRADEMARK OFFICE
CERTIFICATE OF CORRECTION

PATENT NO. : 4,656,535

DATED : April 7, 1987

INVENTOR(S) : Minoru USUI

It is certified that error appears in the above-identified patent and that said Letters Patent is hereby corrected as shown below:

On the title page under "Foreign Application Priority Data",

"57-38016" should read -- 57-38016(U) --;

"57-136530" should read -- 57-136530(U) --;

"57-197030" should read -- 57-197030(U) --.

Signed and Sealed this

Twenty-second Day of March, 1988

*Attest:*

DONALD J. QUIGG

*Attesting Officer* *Commissioner of Patents and Trademarks*